(12) United States Patent
Kitamoto et al.

(10) Patent No.: US 11,616,464 B2
(45) Date of Patent: Mar. 28, 2023

(54) POWER FEED CONTROL SYSTEM AND POWER FEED CONTROL METHOD

(71) Applicant: HONDA MOTOR CO., LTD., Tokyo (JP)

(72) Inventors: Ryota Kitamoto, Wako (JP); Kenichi Shimizu, Tokyo (JP); Yuki Kuwano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/382,392

(22) Filed: Jul. 22, 2021

(65) Prior Publication Data

US 2022/0029571 A1    Jan. 27, 2022

(30) Foreign Application Priority Data

Jul. 27, 2020   (JP) .............................. JP2020-126508

(51) Int. Cl.
   *H02P 27/06*     (2006.01)
   *H02P 5/74*      (2006.01)
   (Continued)

(52) U.S. Cl.
   CPC ............... *H02P 27/06* (2013.01); *B60K 1/02* (2013.01); *B60L 15/20* (2013.01); *B60L 50/50* (2019.02);
   (Continued)

(58) Field of Classification Search
   CPC .. H02P 27/06; H02P 5/74; B60L 50/50; B60L 58/10; B60L 15/20; B60L 2210/42; B60K 1/02
   See application file for complete search history.

(56) References Cited

U.S. PATENT DOCUMENTS

2018/0337593 A1*  11/2018  Tsujii .................... B60L 50/60
2019/0009690 A1*   1/2019  Kumar ................... B60L 15/32
(Continued)

FOREIGN PATENT DOCUMENTS

JP    2008-288149    11/2008
JP    2016-103460     6/2016
(Continued)

OTHER PUBLICATIONS

Japanese Office Action for Japanese Patent Application No. 2020-126508 dated Feb. 15, 2022.

*Primary Examiner* — Zoheb S Imtiaz
(74) *Attorney, Agent, or Firm* — Amin, Turocy & Watson, LLP

(57) ABSTRACT

A power feed control system includes: a first drive unit configured to include a first electrically driven device, a first inverter, a first fuel battery system, and a first voltage converter; a second drive unit configured to include a second electrically driven device, a second inverter, a second fuel battery system, and a second voltage converter; a common battery; and a control unit configured to perform control of the first inverter or/and the first voltage converter such that each current value of the first inverter and the first fuel battery system achieves a target value of a first current value that is determined on the basis of the first current value flowing between the first drive unit and the battery and a second current value flowing between the second drive unit and the battery and perform control of the second inverter or/and the second voltage converter such that each current value of the second inverter and the second fuel battery system achieves a target value of the second current value that is determined on the basis of the first current value flowing between the first drive unit and the battery and the (Continued)

second current value flowing between the second drive unit and the battery.

14 Claims, 11 Drawing Sheets

(51) Int. Cl.
  *B60K 1/02* (2006.01)
  *B60L 15/20* (2006.01)
  *B60L 58/10* (2019.01)
  *B60L 50/50* (2019.01)
(52) U.S. Cl.
  CPC ................ *B60L 58/10* (2019.02); *H02P 5/74* (2013.01); *B60L 2210/42* (2013.01)

(56) References Cited

U.S. PATENT DOCUMENTS

| | | | |
|---|---|---|---|
| 2020/0392758 A1* | 12/2020 | Elsmark | ................ H01F 7/1623 |
| 2021/0296890 A1* | 9/2021 | Schneider | ............. H02M 7/493 |

FOREIGN PATENT DOCUMENTS

| | | |
|---|---|---|
| JP | 2018-182918 | 11/2018 |
| JP | 2019-153519 | 9/2019 |
| JP | 2020-077463 | 5/2020 |

* cited by examiner

POWER FEED CONTROL SYSTEM AND POWER FEED CONTROL METHOD

CROSS-REFERENCE TO RELATED APPLICATION

Priority is claimed on Japanese Patent Application No. 2020-126508, filed Jul. 27, 2020, the content of which is incorporated herein by reference.

BACKGROUND OF THE INVENTION

Field of the Invention

The present invention relates to a power feed control system and a power feed control method.

Description of Related Art

Conventionally, as technologies relating to fuel battery systems mounted in vehicles, technologies for controlling power generation of fuel battery systems on the basis of required electric power calculated on the basis of an amount of depression of an accelerator and a temperature and a power storage amount of a secondary battery are known (for example, see Japanese Unexamined Patent Application, First Publication No. 2016-103460).

As a configuration for mounting a plurality of fuel battery systems in one vehicle, in order to control driving of each motor device for two electrically driven devices, a configuration including an AC-DC converter, a fuel battery system, and a battery as a drive unit of different systems may be considered.

SUMMARY OF THE INVENTION

In order to perform an efficient operation of a battery or reduction of a cost, a configuration in which each of the drive units described above is composed of an AC-DC converter (inverter) and a fuel battery system, and the drive units are connected to a common battery may be employed.

However, in a case in which the battery is configured to be common, one battery is not assumed to be driven by different drive units, and thus there are cases in which the battery is over-charged or over-discharged.

One object of an aspect of the present invention is to provide a power feed control system and a power feed control method inhibiting a battery, which is commonly used by drive units, from over-charged or over-discharged when two different drive units respectively drive different electrically driven devices in parallel.

In order to solve the problems described above and achieve a related object, the present invention employs the following aspects.

(1) According to one aspect of the present invention, there is provided a power feed control system including: a first drive unit configured to include a first electrically driven device, a first inverter that is connected to the first electrically driven device and performs conversion between DC power and AC power, a first fuel battery system that supplies DC power to the first inverter, and a first voltage converter that controls a voltage of a DC-side terminal of the first inverter; a second drive unit configured to include a second electrically driven device, a second inverter that is connected to the second electrically driven device and performs conversion between DC power and AC power, a second fuel battery system that supplies DC power to the second inverter, and a second voltage converter that controls a voltage of a DC-side terminal of the second inverter; a battery configured to be commonly connected to the first voltage converter and the second voltage converter; and a control unit configured to perform control of the first inverter or/and the first voltage converter such that each current value of the first inverter and the first fuel battery system achieves a target value of a first current value that is determined on the basis of the first current value flowing between the first drive unit and the battery and a second current value flowing between the second drive unit and the battery and perform control of the second inverter or/and the second voltage converter such that each current value of the second inverter and the second fuel battery system achieves a target value of the second current value that is determined on the basis of the first current value flowing between the first drive unit and the battery and the second current value flowing between the second drive unit and the battery.

(2) In the aspect (1) described above, the control unit may add the first current value and the second current value and, in a case in which a result of the addition exceeds a predetermined first threshold current value set in a discharge current of the battery, perform torque limiting by decreasing DC power supplied to the first electrically driven device and perform torque limiting by decreasing DC power supplied to the second electrically driven device.

(3) In the aspect (2) described above, the control unit, after performing torque limiting by decreasing the DC power supplied to the first electrically driven device, may add the first current value and the second current value and perform torque limiting by decreasing the DC power supplied to the second electrically driven device in a case in which a result of the addition exceeds the first threshold current value.

(4) In any one of the aspects (1) to (3) described above, the control unit may add the first current value and the second current value and, in a case in which a result of the addition exceeds a predetermined second threshold current value set in a charge current of the battery, decrease DC power supplied from the first fuel battery system to the first electrically driven device and decreases DC power supplied from the second fuel battery system to the second electrically driven device.

(5) In the aspect (4) described above, the control unit, after reducing generation of DC power of the first fuel battery system, may add the first current value and the second current value and reduce generation of DC power of the second fuel battery system in a case in which a result of the addition exceeds the second threshold current value.

(6) In any one of the aspects (1) to (5) described above, the control unit is a first control unit of the first drive unit and a second control unit of the second drive unit, the power feed control system may further include: a (1-1)-th current sensor configured to acquire the first current value and output the acquired value to the first control unit; a (1-2)-th current sensor configured to acquire the first current value and output the acquired value to the second control unit; a (2-1)-th current sensor configured to acquire the second current value and output the acquired value to the first control unit; and a (2-2)-th current sensor configured to acquire the second current value and output the acquired value to the second control unit.

(7) In the aspect (6) described above, a total current sensor is disposed between a power supply terminal of the battery and a point branching into the first drive unit and the second drive unit in place of each of the (1-2)-th current sensor and the (2-1)-th current sensor, and the total current sensor may acquire a current value acquired by adding the first current value and the second current value.

(8) In any one of the aspects (1) to (5) described above, a first current sensor configured to acquire the first current value and output the acquired value to the control unit and a second current sensor configured to acquire the second current value and output the acquired value to the control unit may be further included.

(9) A power feed control method according to one aspect of the present invention is a power feed control method for driving a power feed control system including: a first drive unit configured to include a first electrically driven device, a first inverter that is connected to the first electrically driven device and performs conversion between DC power and AC power, a first fuel battery system that supplies DC power to the first inverter, and a first voltage converter that performs voltage control of controlling a voltage of a DC-side terminal of the first inverter; a second drive unit configured to include a second electrically driven device, a second inverter that is connected to the second electrically driven device and performs conversion between DC power and AC power, a second fuel battery system that supplies DC power to the second inverter, and a second voltage converter that controls a voltage of a DC-side terminal of the second inverter; a battery configured to be commonly connected to the first voltage converter and the second voltage converter; and a control unit, the power feed control method including performing control of the first inverter or/and the first voltage converter such that each current value of the first inverter and the first fuel battery system achieves a target value of a first current value that is determined on the basis of the first current value flowing between the first drive unit and the battery and a second current value flowing between the second drive unit and the battery and performing control of the second inverter or/and the second voltage converter such that each current value of the second inverter and the second fuel battery system achieves a target value of the second current value that is determined on the basis of a first current value flowing between the first drive unit and the battery and a second current value flowing between the second drive unit and the battery by using the control unit.

According to the aspects (1) to (9) described above, when two different drive units drive different electrically driven devices in parallel, a battery that is commonly used by these drive units can be inhibited from over-charged or over-discharged.

DETAILED DESCRIPTION OF THE INVENTION

Hereinafter, embodiments of the present invention will be described with reference to the drawings. Hereinafter, an example in which a power feed control system is mounted in an electric vehicle will be described. For example, the electric vehicle is a fuel battery vehicle that uses electric power generated by a fuel battery as electric power for traveling or electric power for operating an in-vehicle device. This electric vehicle is an example of an electrically driven device that operates using electric power and is an automobile having two wheels, three wheels, four wheels, or the like. For example, the electric vehicle may be a large vehicle such as a bus or a truck in which two drive units including fuel battery systems to be described below can be mounted in parallel. The power feed control system may be mounted in an electrically driven device other than the electric vehicle (for example, a ship, a flying object, or a robot).

Figure 1:
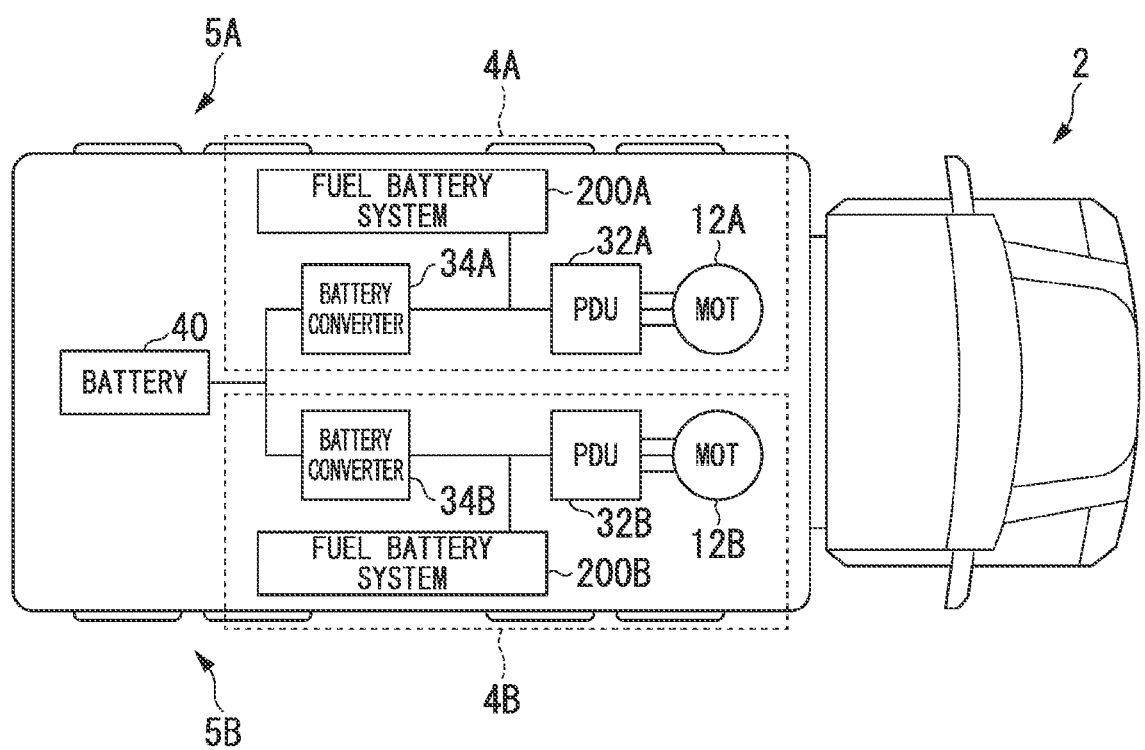
FIG. 1 is a diagram illustrating an example of a schematic configuration of an electric vehicle according to an embodiment.

FIG. 1 is a diagram illustrating an example of a schematic configuration of an electric vehicle 1 according to this embodiment. As illustrated in FIG. 1, the electric vehicle 1 includes a cab bag 2, a drive unit 4A (4A #), a drive unit 4B (4B #), a vehicle wheel 5A, a vehicle wheel 5B, and a battery 40. In the following description, in a case in which the drive units 4A and 4B do not need to be distinguished from each other, they will be described simply as a "drive unit 4" without adding A or B. Similarly, in a case in which fuel battery systems 200A and 200B do not need to be distinguished from each other, they will be described simply as a "fuel battery system 200" without adding A or B.

The cab bag 2 is a part that includes a driver's seat and the like. Motors 12 (MOT) included in the drive units 4 drive the vehicle wheels 5A and 5B to rotate through transmissions (transmission gears) that are not illustrated and shafts (for example, propeller shafts) connected to gears connected to the vehicle wheels 5A and 5B. The drive unit 4A includes a motor (MOT) 12A, a fuel battery system 200A, a battery converter 34A, and an inverter (PDU) 32A and performs control of a motor 12A in parallel using the common battery 40. The drive unit 4B includes a motor (MOT) 12B, a fuel battery system 200B, a battery converter 34B, and an inverter (PDU) 32B and performs control of a motor 12B in parallel using the common battery 40. For example, FIG. 1 illustrates an example in which a torque required for a large vehicle (a truck or the like) is formed by combining torques generated by both of the motors 12A and 12B using the drive units 4A and 4B of a small vehicle in parallel, and the vehicle wheels 5A and 5B are driven.

The schematic configuration of the electric vehicle 1 illustrated in FIG. 1 is an example, and the configuration is not limited thereto.

First Embodiment

Figure 2:
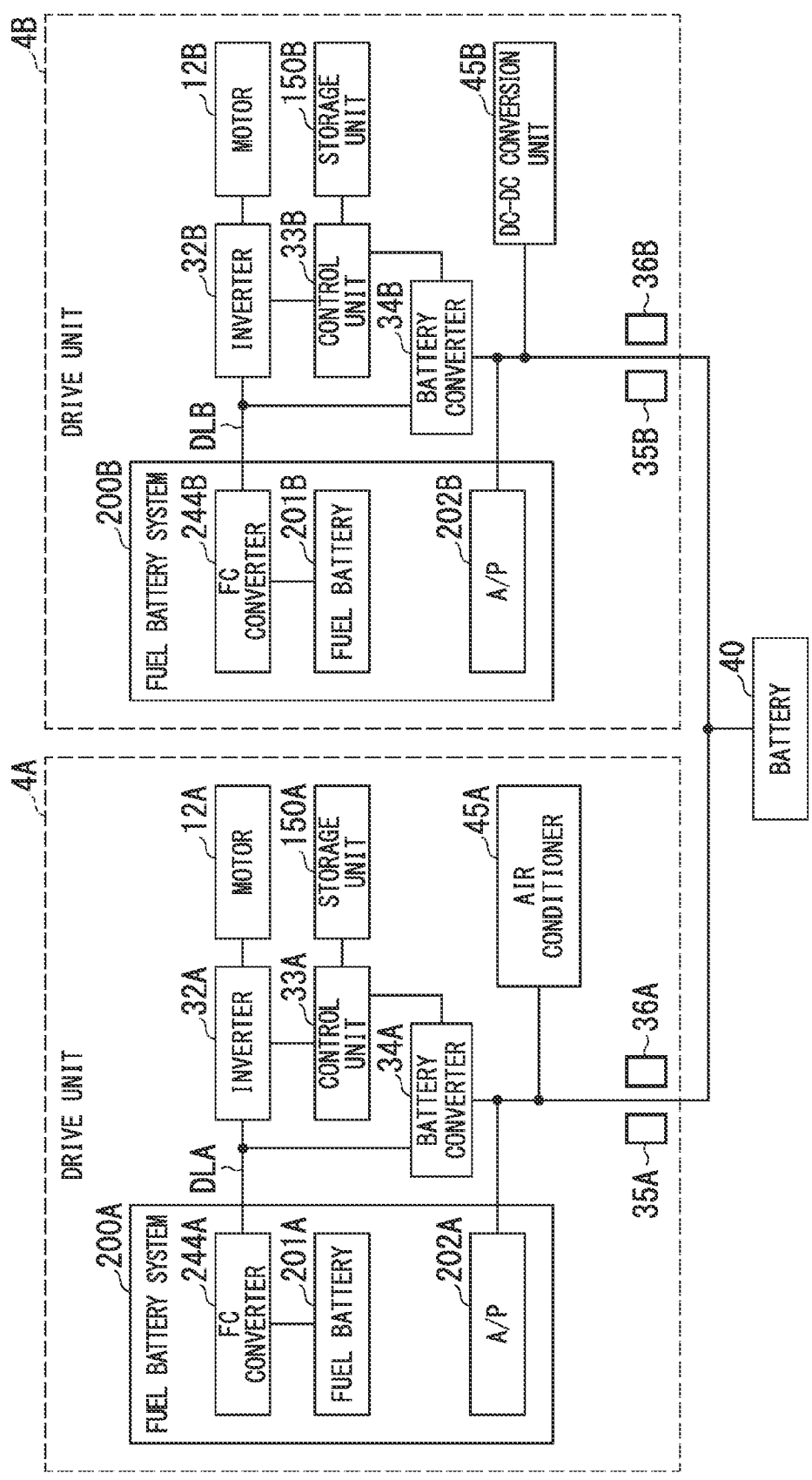
FIG. 2 is a block diagram illustrating an example of the configuration of a power feed control system including a drive unit 4 according to a first embodiment.

Next, an example of the configuration of the drive units 4A and 4B according to a first embodiment will be described. FIG. 2 is a block diagram illustrating an example of the configuration of a power feed control system including drive units 4 according to the first embodiment. As illustrated in FIG. 2, the power feed control system includes a drive unit 4A, a drive unit 4B, and a battery 40. The drive unit 4A includes a fuel battery system 200A, a battery converter 34A, an inverter 32A, a motor 12A, a control unit 33A, an air conditioner 45A, a current sensor 35A, a current sensor 36A, and a storage unit 150A. The drive unit 4B includes a fuel battery system 200B, a battery converter 34B, an inverter 32B, a motor 12B, a control unit 33B, a DC-DC conversion unit 45B, a current sensor 35B, a current sensor 36B, and a storage unit 150B.

The fuel battery system 200 is an example of "fuel battery system" and includes a fuel cell (FC) converter 244, a fuel battery 201, and an air pump 202. The FC converter 244, for example, is a DC-DC converter of a boosting type that boosts a voltage of the fuel battery 201. The fuel battery 201, for example, is a battery configured to have hydrogen as an energy source for generating electricity. The air pump 202 is a compressor 214 that is used for a fuel cell cooling system 280 to be described below.

The fuel battery system 200, for example, includes a fuel battery. For example, the fuel battery generates power in accordance with a reaction of hydrogen contained in fuel gas as fuel and oxygen contained in the air as an oxidizer. The fuel battery system 200 generates power of an instructed power amount in accordance with control of the control unit 33 and outputs the generated power, for example, to a DC link DL between the inverter 32 and the battery converter 34 to perform power feed. In accordance with this, electric power supplied by the fuel battery system 200 is supplied to the motor 12 through the inverter 32, is supplied to the battery 40 through the battery converter 34 and accumulated in the battery 42, or is supplied as electric power that is necessary for other auxiliary devices and the like under the control of the control unit 33 or the like. An example of a detailed configuration of the fuel battery system 200 will be described below.

For example, the motor 12 is a three-phase AC electric motor. A rotor of the motor 12 is connected to the vehicle wheels 5A and 5B that are driving wheels illustrated in FIG. 1. The motor 12 outputs driving forces used for causing the electric vehicle 1 to travel to the vehicle wheels 5A and 5B by using at least one of electric power generated by the fuel battery system 200 and electric power accumulated by the battery system 40. The motor 12 generates power using kinetic energy of a vehicle at the time of decelerating the vehicle.

For example, the inverter 32 is an AC-DC converter. The inverter 32 has an AC-side terminal connected to the motor 12 and a DC-side terminal connected to the DC link DL (DLA/DLB). The inverter 32 converts a DC current input from the DC-side terminal into a three-phase AC current and supplies the converted three-phase AC current to the motor 12. The inverter 32 is connected to the battery 40 through the DC link DL and the battery converter 34. The inverter 32 converts an AC current generated by the motor 12 into a DC current and outputs the converted DC current to the DC link DL.

The battery converter 34, for example, is a DC-DC converter of a boosting type. The battery converter 34 boosts a DC voltage supplied from the battery 40 and outputs the boosted DC voltage to the DC link DL. The battery converter 34 outputs a regenerative voltage supplied from the motor 12 or an FC voltage supplied from the fuel battery system 200 to the battery 40.

The battery converter 34 performs voltage control such that the voltage of the DC-side terminal of the inverter 32 is a predetermined voltage (a voltage supplied to the DC-side terminal of the inverter 32 that is acquired by boosting a DC voltage).

The battery 40 is a battery serving as an energy source and, for example, is a battery that is repeatedly chargeable and rechargeable such as a nickel hydrogen battery, a lithium ion secondary battery, or a sodium ion battery. The battery 42, for example, accumulates electric power generated by the motor 12 or the fuel battery system 200 and performs discharging for allowing the electric vehicle 10 to travel or operating in-vehicle devices. The battery 40 includes a battery sensor that detects a current value, a voltage value, and a temperature of the battery 40. The battery 40, for example, may be connected to an external charging facility and charge electric power supplied from a charging/discharging device.

The air conditioner 45A is an air conditioning device known an air conditioner that adjusts a temperature, humidity, and the like of the inside of the electric vehicle.

The DC-DC conversion unit 45B performs DC-DC conversion. The DC-DC conversion unit 45, for example, converts a DC voltage of about 300 V output by the battery 40 into a DC voltage of 12 V.

The current sensor 35A acquires an acquisition value MIA as a current value (a first current value) of a current IA (a first current) flowing between the battery converter 34A and the battery 40 and outputs the acquired acquisition value MIA to the control unit 33A of the drive unit 4A.

The current sensor 36A acquires an acquisition value MIA as a current value (a first current value) of a current IA (a first current) flowing between the battery converter 34A and the battery 40 and outputs the acquired acquisition value MIA to the control unit 33B of the drive unit 4B.

The current sensors 35A and 36A, for example, are Hall elements and are two elements sealed in a package.

The current sensor 35B acquires an acquisition value MIB as a current value (a second current value) of a current IB (a second current) flowing between the battery converter 34B and the battery 40 and outputs the acquired acquisition value MIB to the control unit 33B of the drive unit 4B.

The current sensor 36B acquires an acquisition value MIB as a current value (a second current value) of a current IB (a second current) flowing between the battery converter 34B and the battery 40 and outputs the acquired acquisition value MIB to the control unit 33A of the drive unit 4A.

The current sensors 35B and 36B, for example, are Hall elements and are two elements sealed in a package.

The current sensors 35A and 36A may not be Hall elements and may be configured as one in a case in which an acquisition value is output as a digital value, and the acquisition value MIA may be configured to be output to both of the control unit 33A of the drive unit 4A and the control unit 33B of the drive unit 4B. Similarly, the current sensors 35B and 36B may not be Hall elements and may be configured as one in a case in which an acquisition value is output as a digital value, and the acquisition value MIB may be configured to be output to both of the control unit 33A of the drive unit 4A and the control unit 33B of the drive unit 4B. Each of the current sensors 35A and 36A may be configured to acquire a current value by estimating the current value on the basis of a relation between an electric potential difference between both ends of an electric circuit and a current flowing through the electric circuit using Ohm's law. Similarly, each of the current sensors 35B and 36B may be configured to acquire a current value by estimating the current value on the basis of a relation between an electric potential difference between both ends of an electric circuit and a current flowing through the electric circuit using Ohm's law.

The data transmission of the acquisition value MIA from the current sensor 35A to the control unit 33A and the data transmission from the current sensor 36A to the control unit 33B may be performed not in a wired manner but in a wireless manner. Similarly, the data transmission of the acquisition value MIB from the current sensor 35B to the control unit 33B and the data transmission from the current sensor 36B to the control unit 33A may be performed not in a wired manner but in a wireless manner.

The control unit 33 controls traveling of the electric vehicle 1, operations of in-vehicle devices, and the like. For example, the control unit 33 controls supply and the like of electric power charged in the battery 40, electric power generated by the fuel battery system 200, and the like in accordance with requested electric power from the electric vehicle 1. The requested electric power from the electric vehicle 1, for example, is a total load of electric power requested for driving or operating loads of the electric vehicle 1. For example, the loads include the motor 12, a brake device that is not illustrated, vehicle sensors, display devices, and auxiliary devices such as other in-vehicle devices. The control unit 33 may perform traveling control and the like of the electric vehicle 1. Details of the function of the control unit 33 will be described below.

For example, the storage unit 150 is realized by a storage medium such as a hard disk drive (HDD), a flash memory, an electrically erasable programmable read only memory (EEPROM), a read only memory (ROM), or a random access memory (RAM). Various kinds of information necessary for power control are stored in the storage unit 150. The various kinds of information necessary for power control will be described below.

[Fuel Battery System]

Figure 3:
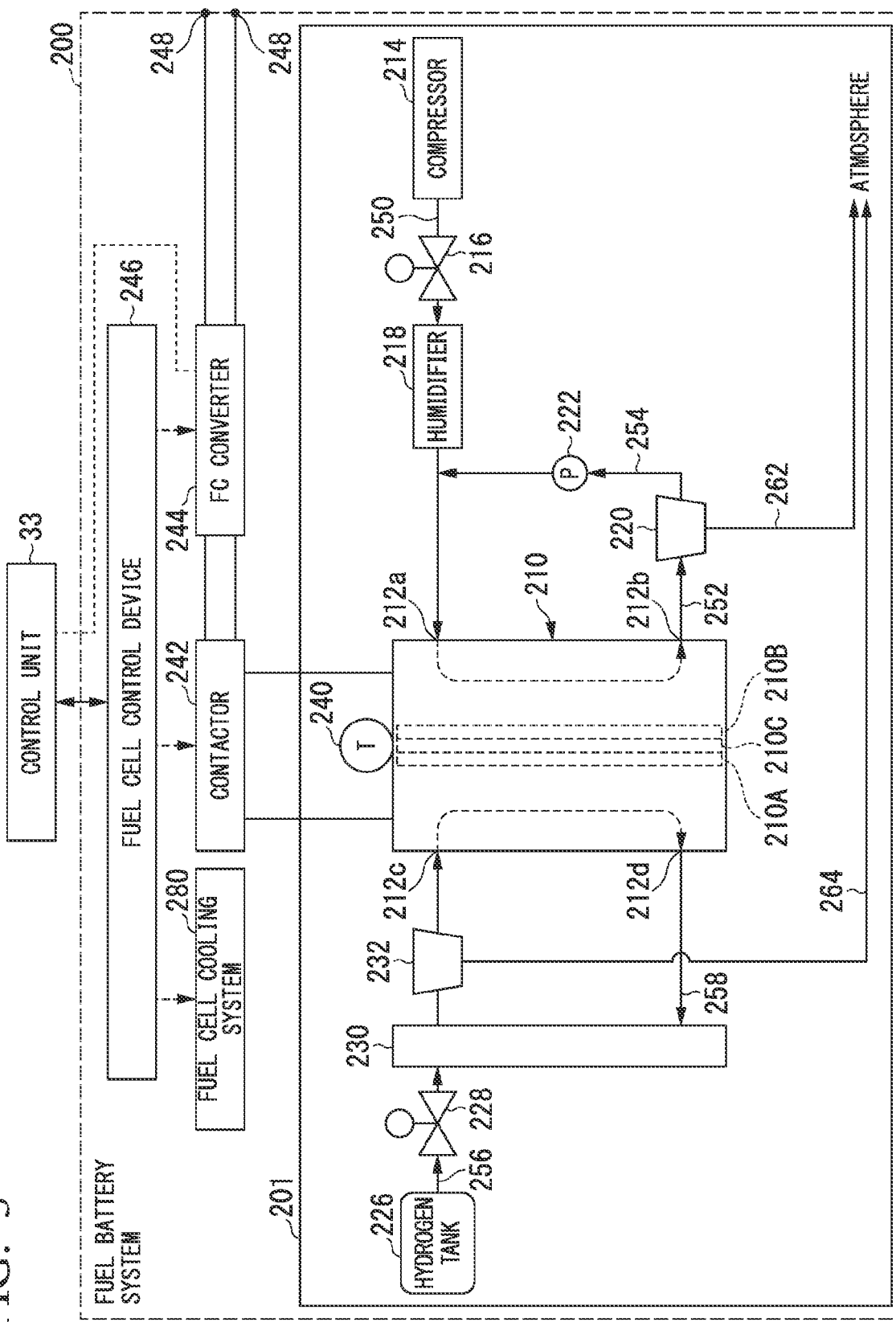
FIG. 3 is a diagram illustrating an example of the configuration of a fuel battery system 200 according to the first embodiment.

Here, the fuel battery system 200 will be specifically described. FIG. 3 is a diagram illustrating an example of the configuration of the fuel battery system 200 according to this embodiment. The configuration illustrated in FIG. 3 can be applied to each of a plurality of fuel battery systems 200 mounted in the electric vehicle 10. The fuel battery system 200 according to this embodiment is not limited to the following configuration and, for example, may have any configuration as long as it is a system configuration in which power is generated using an anode and a cathode. The fuel battery system 200 illustrated in FIG. 3, for example, includes an FC stack 210, a compressor 214, a sealing inlet valve 216, a humidifier 218, a gas-liquid separator 220, an exhaust circulation pump (P) 222, a hydrogen tank 226, a hydrogen supply valve 228, a hydrogen circulation unit 230, a gas-liquid separator 232, a temperature sensor (T) 240, a contactor 242, an FC converter 244, an FC control device 246, and an FC cooling system 280.

The FC stack 210 includes a laminated body (not illustrated) in which a plurality of fuel battery cells are stacked and one pair of end plates (not illustrated) having this laminated body interposed therebetween from both ends in a stacking direction. The fuel battery cell includes a membrane electrode assembly (MEA) and one pair of separators having this membrane electrode assembly interposed therebetween from both sides in an assembly direction. For example, the membrane electrode assembly includes an anode 210A formed from an anode catalyst and a gas diffusion layer, a cathode 210B formed from a cathode catalyst and a gas diffusion layer, and a solid polyelectrolyte membrane 210C formed from a cation exchange membrane and the like interposed between both sides in a thickness direction using the anode 210A and the cathode 210B.

A fuel gas containing hydrogen as a fuel is supplied to the anode 210A from the hydrogen tank 226. The air that is an oxidizer gas (reaction gas) containing oxygen as an oxidizer is supplied from the compressor 214 to the cathode 210B. Hydrogen supplied to the anode 210A is ionized in accordance with a catalytic reaction on the anode catalyst, and hydrogen ions move to the cathode 210B through the solid polyelectrolyte membrane 210C that is properly humidified. Electrons generated in accordance with movement of the hydrogen ions can be extracted to external circuits (for example, the FC converter 244 and the like) as a DC current. The hydrogen ions that have moved from the anode 210A onto the cathode catalyst of the cathode 210B react with oxygen supplied to the cathode 210B and electrons on the cathode catalyst and generates water.

The compressor 214 includes a motor that is controlled to be driven by the FC control device 246 and the like, takes in air from the outside and compresses the air using a driving force of this motor, and sends compressed air to an oxidizer gas supply passage 250 connected to the cathode 210B, thereby pumping an oxidizer gas to the fuel battery.

The sealing inlet valve 216 is disposed in the oxidizer gas supply passage 250 connecting the compressor 214 and a cathode supply port 212a that can supply air to the cathode 210B of the FC stack 210 and is opened or closed under the control of the FC control device 246.

The humidifier 218 humidifies air sent from the compressor 214 to the oxidizer gas supply passage 250. For example, the humidifier 218 includes a water permeation membrane, for example, such as a hollow fiber membrane and humidifies air by adding moisture to the air by bringing the air from the compressor 214 to be in contact with water through the water permeation membrane.

The gas-liquid separator 220 discharges a cathode exhaust gas and liquid water discharged from a cathode discharge port 212b to an oxidizer gas discharge passage 252 without being consumed by the cathode 210B into the atmosphere through an exhaust passage 262 of the cathode. The gas-liquid separator 220 may separate the cathode discharge gas discharged to the oxidizer gas discharge passage 252 and the liquid water and cause only the separated cathode discharge gas to flow into an exhaust re-circulation passage 254.

The exhaust circulation pump 222 is disposed in the exhaust re-circulation passage 254, mixes the cathode discharge gas that has flowed from the gas-liquid separator 220 to the exhaust re-circulation passage 254 with air circulating through the oxidizer gas supply passage 250 from the sealing inlet valve 216 to the cathode supply port 212a, and supplies the mixed gas to the cathode 210B again.

The hydrogen tank 226 stores hydrogen in a compressed state. The hydrogen supply valve 228 is disposed in a fuel gas supply passage 256 that connects the hydrogen tank 226 and an anode supply port 212c that can supply hydrogen to the anode 210A of the FC stack 210. In a case in which the hydrogen supply valve 228 is open in accordance with the control of the FC control device 246, it supplies hydrogen stored in the hydrogen tank 226 to the fuel gas supply passage 256.

For example, the hydrogen circulation unit 230 is a pump that circulates and supplies a fuel gas to the fuel battery. For example, the hydrogen circulation unit 230 circulates an anode discharge gas discharged from the anode discharge port 212d to a fuel gas discharge passage 258 without being consumed by the anode 210A to the fuel gas supply passage 256 that causes a gas to flow into the gas-liquid separator 232.

The gas-liquid separator 232 separates an anode discharge gas and liquid water circulating from the fuel gas discharge passage 258 to the fuel gas supply passage 256 in accordance with an action of the hydrogen circulation unit 230. The gas-liquid separator 232 supplies the anode discharge gas separated from the liquid water to the anode supply port 212c of the FC stack 210. The liquid water discharged to the gas-liquid separator 232 is discharged into the atmosphere through a drain pipe 264.

The temperature sensor 240 detects temperatures of the anode 210A and the cathode 210B of the FC stack 210 and outputs detection signals (temperature information) to the FC control device 246.

The contactor 242 is disposed between the anode 210A and the cathode 210B of the FC stack 210 and the FC converter 244. The contactor 242 electrically connects or disconnects the FC stack 210 and the FC converter 244 on the basis of control from the FC control device 246.

For example, the FC converter 244 is a DC-DC converter of a boosting type. The FC converter 244 is disposed between the anode 210A and the cathode 210B of the FC stack 210 disposed through the contactor 242 and an electrical load. The FC converter 244 boosts the voltage of an output terminal 248 connected to an electrical load side to a target voltage that is determined by the FC control device 246. The FC converter 244, for example, boosts a voltage output from the FC stack 210 to a target voltage and outputs the boosted voltage to the output terminal 248. The output terminal 248 is connected to the DC-side terminal of the inverter 32 to be described below.

The FC control device 246 controls start and end of power generation, the amount of generated power, and the like in the fuel battery system 200 in accordance with power generation control using the control unit 33. The FC control device 246 performs control relating to temperature adjustment of the fuel battery system 200 using the FC cooling system 280. The FC control device 246, for example, may be substituted with a control device such as the control unit 33. In addition, the FC control device 246 may perform power feed control of the electric vehicle 10 in cooperation with the control unit 33 and the control device 80.

For example, in a case in which the temperature of the FC stack 210 detected by the temperature sensor 240 is equal to or higher than a threshold, the FC cooling system 280 cools the fuel battery system 200 in accordance with control using the FC control device 246. For example, the FC cooling system 280 discharges heat of the FC stack 210 by causing a refrigerant to circulate in a flow passage disposed inside the FC stack 210 by using a circulation pump (not illustrated), thereby cooling the temperature of the FC stack 210. In a case in which the fuel battery system 200 is generating power, the FC cooling system 280 may perform control of heating or cooling the FC stack 210 such that the temperature acquired using the temperature sensor 240 is maintained in a predetermined temperature range.

[Control Unit]

Figure 4:
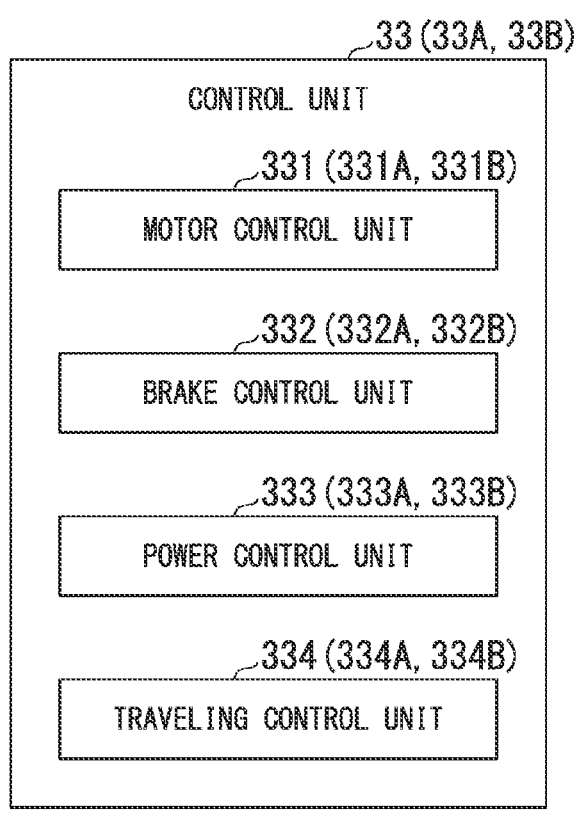
FIG. 4 is a diagram illustrating an example of the configuration of a control unit 33 according to the first embodiment.

FIG. 4 is a diagram illustrating an example of the configuration of the control unit 33 according to the first embodiment. For example, the control unit 33 includes a motor control unit 331, a brake control unit 332, a power control unit 333, and a traveling control unit 334. Each of the motor control unit 331, the brake control unit 332, the power control unit 333, and the traveling control unit 334 is realized by a hardware processor such as a central processing unit (CPU) executing a program (software). Some or all of such constituent elements may be realized by hardware (a circuit unit; includes circuitry) such as a large scale integration (LSI), an application specific integrated circuit (ASIC), a field-programmable gate array (FPGA), a graphics processing unit (GPU), or the like or may be realized by software and hardware in cooperation. The program may be stored in advance in a storage device (a storage device including a non-transitory storage medium) such as an HDD or a flash memory of the electric vehicle 1 or may be stored in a storage medium that can be loaded or unloaded such as a DVD or a CD-ROM and be installed in an HDD or a flash memory of the electric vehicle 1 by loading the storage medium (a non-transitory storage medium) into a drive device. For example, the storage device described above is the storage unit 150.

The motor control unit 331 calculates a driving force required for the motor 12 on the basis of an output of a vehicle sensor (not illustrated) and performs control of the motor 12 such that it outputs the calculated driving force.

The brake control unit 332 calculates a braking force required for a braking device (not illustrated), which is an auxiliary device, on the basis of the output of the vehicle sensor described above and performs control of the brake device such that it outputs the calculated braking force.

The power control unit 333 calculates a required amount of power that is required for the battery 40 and the fuel battery system 200 on the basis of the output of the vehicle sensor. For example, the power control unit 333 calculates a torque to be output by the motor 12 on the basis of a degree of accelerator opening and a vehicle speed and calculates a required amount of power by adding up a driving shaft load power requested from the torque and the number of revolutions of the motor 12 and an electric power requested by auxiliary devices and the like. The power control unit 333 manages a charged state (electricity storage status) of the battery 40. For example, the power control unit 333 calculates a state of charge (SOC) (a battery charging rate) of the battery 40 on the basis of the output of the battery sensor included in the battery 40. For example, in a case in which the SOC of the battery 40 is lower than a predetermined value, the power control unit 333 executes control for charging the battery 40 using power generation using the fuel battery system 200. In a case in which the SOC of the battery 40 is higher than the predetermined value, the power control unit 86 may perform control for stopping charging control or causing auxiliary devices and the like to consume a surplus power generated by the fuel battery system 200.

Here, in a case in which a discharge current (a current having "+" polarity in this embodiment) for the battery converter 34A flows from the battery 40, the power control unit 333A adds an acquisition value MIA (a first current value) supplied from the current sensor 35A of the drive unit 4A and an acquisition value MIB (a second current value) supplied from the current sensor 36B of the drive unit 4B and determines whether or not a result of the addition exceeds a discharge current value DA as a threshold set in advance. In a case in which a discharge current (a current having "+" polarity in this embodiment) for the battery converter 34B flows from the battery 40, the power control unit 333B adds an acquisition value MIB (a second current value) supplied from the current sensor 35B of the drive unit 4B and an acquisition value MIA (a first current value) supplied from the current sensor 36A of the drive unit 4A and determines whether or not a result of the addition exceeds a discharge current value DB as a threshold set in advance.

Figure 5:
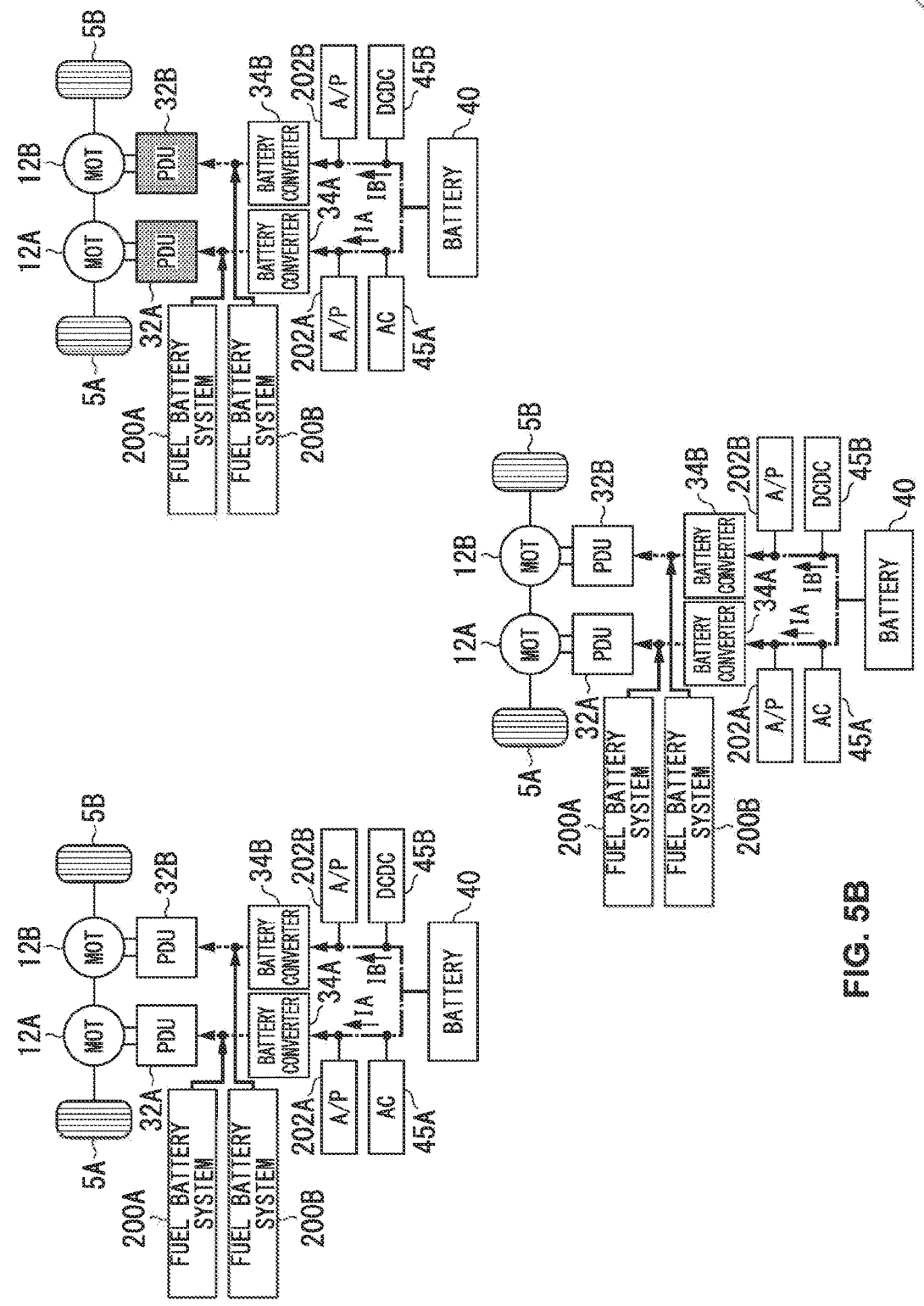
FIGS. 5A to 5C are conceptual diagrams illustrating operations performed in a case in which a discharge current is caused to flow out from a battery 40.

FIGS. 5A to 5C are conceptual diagrams illustrating operations performed in a case in which a discharge current is caused to flow out from the battery 40. In FIGS. 5A to 5C, a thickness of each line is illustrated in proportion to a current amount.

In FIG. 5A, the power control unit 333A supplies a required amount of power for obtaining a necessary torque to the battery converter 34A and the fuel battery system 200A (the FC converter 244A) on the basis of an output of the vehicle sensor. In accordance with this, the inverter 32A drives the motor 12A using a predetermined torque in accordance with DC power obtained by adding up DC power supplied from the fuel battery system 200 and DC power supplied from the battery for adjusting a shortage. The power control unit 333B supplies a required amount of power for obtaining a necessary torque to the battery converter 34B and the fuel battery system 200B (the FC converter 244B) on the basis of an output of the vehicle sensor. In accordance with this, the inverter 32B drives the motor 12B using a predetermined torque in accordance with DC power obtained by adding up DC power supplied from the fuel battery system 200B and DC power supplied from the battery for adjusting a shortage.

In FIG. 5B, for example, in a case in which a driving force of a vehicle exceeds a frictional force of tires, and a wheel spin occurs, the number of revolutions of the motor 12 rapidly increases, whereby the power consumption of the motor 12 rapidly increases. At this time, the power control unit 333A instructs the fuel battery system 200A to supply a predetermined DC power, and the power control unit 333B instructs the fuel battery system 200B to supply a predetermined DC power. For this reason, the fuel battery system 200A supplies an instructed current value to the inverter 32A, and the fuel battery system 200B supplies an instructed current value to the inverter 32B.

However, since power consumption rapidly increases, a voltage of the DC-side terminal of the inverter 32A is lowered, and thus, in order to maintain a voltage of an instruction received from the power control unit 333A, the battery converter 34A rapidly increases a discharge current from the battery 40. Similarly, a voltage of the DC-side terminal of the inverter 32B is lowered, and thus, in order to maintain a voltage of an instruction received from the power control unit 333B, the battery converter 34B rapidly increases a discharge current from the battery 40. In this way, since the currents IA and IB that are discharge currents from the battery 40 increase, in accordance with continuation of this state, the battery 40 becomes in an over-discharged state.

In FIG. 5C, the power control unit 333A adds an acquisition value MIA of a current IA supplied from the current sensor 35A and an acquisition value MIB of a current IB supplied from the current sensor 36B and acquires a result of the addition as a total current value (a discharge current value) IDTA. Then, the power control unit 333A reads a discharge current value DA that is a threshold of a discharge current, which has been set in advance, from the storage unit 150A and compares the read discharge current value DA with the total current value IDTA. At this time, in a case in which the total current value IDTA is equal to or lower than the discharge current value DA, the power control unit 333A determines that there is no rapid increase in the discharge current and does not perform a process for inhibiting over-discharge. On the other hand, in a case in which the total current value IDTA exceeds the discharge current value DA, the power control unit 333A determines that a rapid increase in the discharge current has occurred and reduces a torque to be output by the motor 12A to a predetermined limit torque. In other words, the power control unit 333A reads an adjustment voltage value that is a required amount of power corresponding to the limit torque, which is stored in association with the discharge current value DA, from the storage unit 150A and outputs this adjustment voltage value to the battery converter 34A as an instruction value. In accordance with this, a voltage value maintained in the DC-side terminal of the inverter 32A is lowered, and thus, the battery converter 34A decreases the current IA from the battery 40. The power control unit 333A reads an adjustment current value at the time of limiting the torque to the limit torque from the storage unit 150A and outputs an instruction to the fuel battery system 200A such that the read adjustment current value is set. At this time, the power control unit 333A reads the adjustment value at the time of limiting the torque to the limit torque from the storage unit 150A and outputs an adjustment value for setting the limit torque to the inverter 32A as an instruction.

Similarly, the power control unit 333B adds an acquisition value MIA of a current IA supplied from the current sensor 36A and an acquisition value MIB of a current IB supplied from the current sensor 35B and acquires a result of the addition as a total current value (a discharge current value) IDTB. Then, the power control unit 333B reads a discharge current value DB that is a threshold of a discharge current, which has been set in advance, from the storage unit 150B and compares the read discharge current value DB with the total current value IDTB. At this time, in a case in which the total current value IDTB is equal to or lower than the discharge current value DB, the power control unit 333B determines that there is no rapid increase in the discharge current and does not perform a process for inhibiting over-discharge. On the other hand, in a case in which the total current value IDTB exceeds the discharge current value DB, the power control unit 333B determines that a rapid increase in the discharge current has occurred and reduces a torque to be output by the motor 12 to a predetermined limit torque. In other words, the power control unit 333B reads an adjustment voltage value that is a required amount of power corresponding to the limit torque, which is stored in association with the discharge current value DB, from the storage unit 150B and outputs this adjustment voltage value to the battery converter 34B as an instruction value. In accordance with this, a voltage value maintained in the DC-side terminal of the inverter 32B is lowered, and thus, the battery converter 34B decreases the current IB from the battery 40. The power control unit 333B reads an adjustment current value at the time of limiting the torque to the limit torque from the storage unit 150B and outputs an instruction to the fuel battery system 200B such that the read adjustment current value is set. At this time, the power control unit 333B reads the adjustment value at the time of limiting the torque to the limit torque from the storage unit 150B and outputs an adjustment value for setting the limit torque to the inverter 32B as an instruction.

In the configuration described above, the discharge current values DA and DB are assumed to have the same numerical value.

Although the torques of the motors 12A and 12B have been described as being decreased to the limit torque, a configuration in which a state in which no torque is generated in the motors 12A and 12B is used as a "0"-torque state, in other words, the inverters 32A and 32B are stopped may be employed. In such a case, the power control unit 333A outputs an instruction for stopping generation of power in the fuel battery system 200A. Similarly, the power control unit 333B outputs performs control such that generation of power in the fuel battery system 200B is stopped.

In a case in which a charge current (a current having "−" polarity in this embodiment) for the battery 40 flows from the battery converter 34A, the power control unit 333A adds an acquisition value MIA supplied from the current sensor 35A of the drive unit 4A and an acquisition value MIB supplied from the current sensor 36B of the drive unit 4B and determines whether or not a result of the addition exceeds a charge current value CA as a threshold set in advance. In a case in which a charge current (a current having "−" polarity in this embodiment) for the battery 40 flows from the battery converter 34B, the power control unit 333B adds an acquisition value MIB supplied from the current sensor 35B of the drive unit 4B and an acquisition value MIA supplied from the current sensor 36A of the drive unit 4A and determines whether or not a result of the addition exceeds a charge current value CB as a threshold set in advance.

Figure 6:
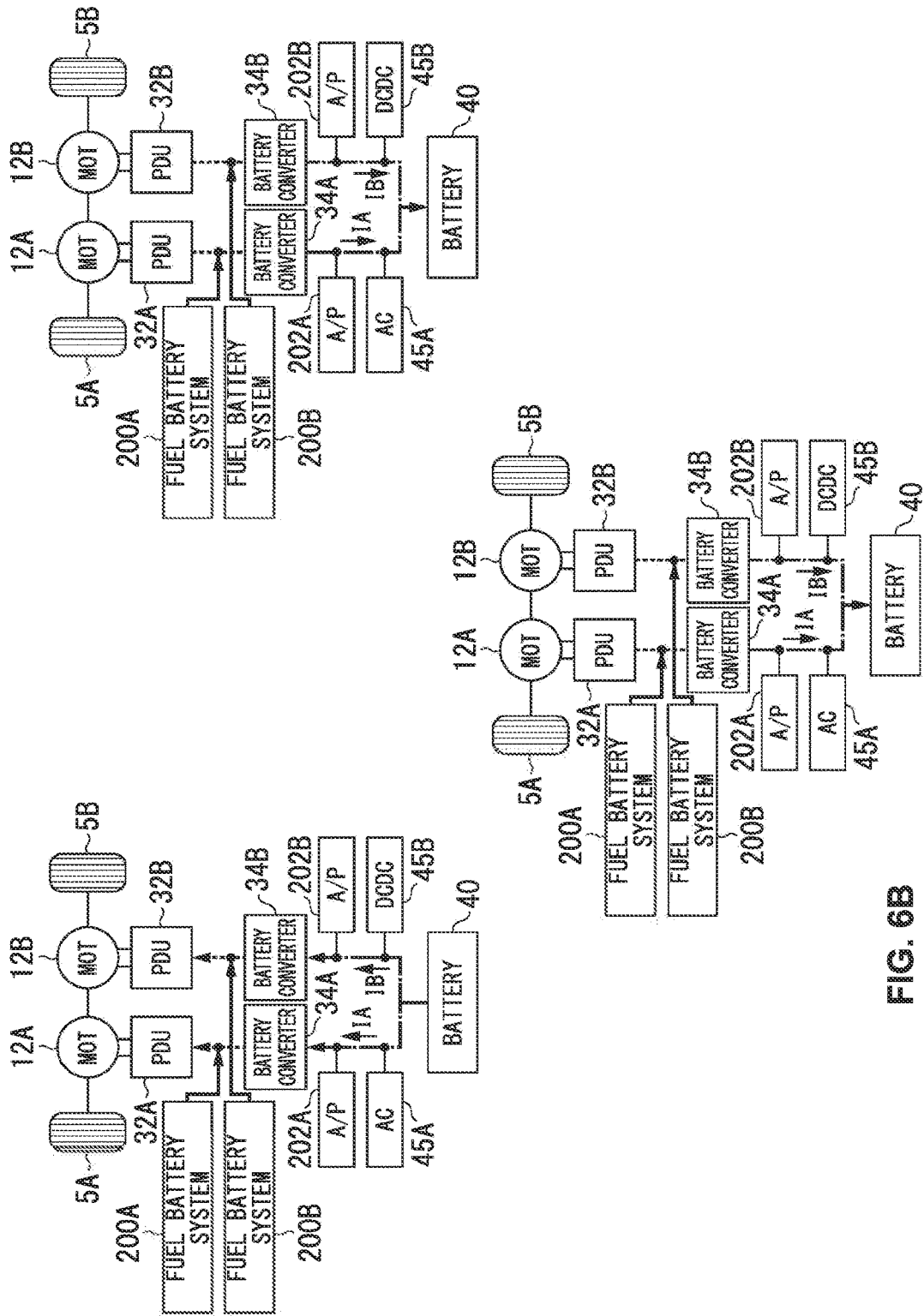
FIGS. 6A to 6C are conceptual diagrams illustrating operations performed in a case in which a charge current is caused to flow into the battery 40.

FIGS. 6A to 6C are conceptual diagrams illustrating operations performed in a case in which a charge current is caused to flow into the battery 40. In FIGS. 6A to 6C, a thickness of each line is illustrated in proportion to a current amount.

In FIG. 6A, the power control unit 333A supplies a required amount of power for acquiring a required torque to the battery converter 34A and the fuel battery system 200A on the basis of an output of the vehicle sensor. In accordance with this, the inverter 32A drives the motor 12A with a predetermined torque using DC power acquired by summing up DC power supplied from the fuel battery system 200A and DC power supplied from the battery for adjusting a shortage. The power control unit 333B supplies a required amount of power for obtaining a required torque to the battery converter 34B and the fuel battery system 200B on the basis of an output of the vehicle sensor. In accordance with this, the inverter 32B drives the motor 12B with a predetermined torque using DC power acquired by summing up DC power supplied from the fuel battery system 200B and DC power supplied from the battery for adjusting a shortage.

In FIG. 6B, for example, in a case in which locking of tires occurs when braking is applied, the number of revolutions of the motor 12 rapidly decreases, and thus power consumption of the motor 12 rapidly decreases. At this time, the power control unit 333A instructs the fuel battery system 200A to supply a predetermined DC power and the power control unit 333B instructs the fuel battery system 200B to supply a predetermined DC power. For this reason, the fuel battery system 200A supplies an instructed current value to the inverter 32A, and the fuel battery system 200B supplies an instructed current value to the inverter 32B.

However, although the power consumption of the motor 12A rapidly decreases, a current for supplying an instructed DC current continuously flows from the fuel battery system 200A. In accordance with this, the voltage of the DC-side terminal of the inverter 32A increases, and thus, in order to maintain a voltage of an instruction received from the power control unit 333A, the battery converter 34A rapidly increases a charge current for the battery 40. Similarly, although the power consumption of the motor 12B rapidly decreases, a current for supplying the instructed DC current continuously flows from the fuel battery system 200B. In accordance with this, the voltage of the DC-side terminal of the inverter 32B increases, and thus, in order to maintain a voltage of an instruction received from the power control unit 333B, the battery converter 34B rapidly increases a charge current for the battery 40. In accordance with this, the currents IA and IB that are charge currents for the battery 40 increase, and thus, in accordance with continuation of this state, the battery 40 comes into an over-charged state.

In FIG. 6C, the power control unit 333A adds an acquisition value MIA of a current IA supplied from the current sensor 35A and an acquisition value MIB of a current IB supplied from the current sensor 36B and acquires a result of the addition as a total current value (a charge current value) ICTA. Then, the power control unit 333A reads a charge current value CA that is a threshold of a charge current, which has been set in advance, from the storage unit 150A and compares the read charge current value CA with the total current value ICTA. At this time, in a case in which the total current value ICTA is equal to or smaller than the charge current value CA, the power control unit 333A determines that there is no rapid increase in the charge current and does not perform a process for inhibiting over-charging. On the other hand, in a case in which the total current value ICTA exceeds the charge current value CA, the power control unit 333A determines that a rapid increase in the charge current has occurred and, in order to decrease DC power output by the fuel battery system 200A (or stop the generation of the DC power), decreases the current value to a predetermined limit current value. In other words, the power control unit 333A reads an adjustment value that is a limit current value, which is stored in association with the charge current value CA, from the storage unit 150A and outputs this adjustment value to the fuel battery system 200A as an instruction value. In accordance with this, in order to decrease a current value caused to flow into the DC-side terminal of the inverter 32A, the fuel battery system 200A decreases a current IA as a charge current for the battery 40 to have a target value set in advance.

Similarly, the power control unit 333B adds an acquisition value MIB of a current IB supplied from the current sensor 35B and an acquisition value MIA of a current IA supplied from the current sensor 36A and acquires a result of the addition as a total current value (a charge current value) ICTB. Then, the power control unit 333A reads a charge current value CB that is a threshold of a charge current, which has been set in advance, from the storage unit 150B and compares the read charge current value CB with the total current value ICTB. At this time, in a case in which the total current value ICTB is equal to or smaller than the charge current value CB, the power control unit 333B determines that there is no rapid increase in the charge current and does not perform a process for inhibiting over-charging. On the other hand, in a case in which the total current value ICTB exceeds the charge current value CB, the power control unit 333B determines that a rapid increase in the charge current has occurred and, in order to decrease DC power output by the fuel battery system 200B, decreases the current value to a predetermined limit current value. In other words, the power control unit 333B reads an adjustment value that is a limit current value, which is stored in association with the charge current value CA, from the storage unit 150B and outputs this adjustment value to the fuel battery system 200B as an instruction value. In accordance with this, in order to decrease a current value caused to flow into the DC-side terminal of the inverter 32B, the fuel battery system 200B decreases a current IB as a charge current for the battery 40 to have a target value set in advance.

In the configuration described above, the charge current values CA and CB are assumed to have the same numerical value.

Although the DC power generated by the fuel battery systems 200A and 200B has been described to be simultaneously decreased (or stopped), after the power control unit 333A decreases DC power generated by the fuel battery system 200A in a case in which an added value of the acquisition values MIA and MIB exceeds the charge current value ICTA, the power control unit 333B may decrease DC power generated by the fuel battery system 200A in a case in which an added value of the acquisition values MIA and MIB exceeds the charge current value ICTA.

The traveling control unit 334 executes driving control for the electric vehicle 1, for example, on the basis of information acquired by a vehicle sensor (not illustrated). The traveling control unit 334 may execute driving control of the electric vehicle 1 on the basis of map information and information acquired from a monitoring unit (not illustrated) in addition to the information acquired by the vehicle sensor described above. The monitoring unit, for example, includes a camera imaging an external space of the electric vehicle 1, a radar or a light detection and ranging (LIDAR) having the outside of the electric vehicle 1 as a detection range, an object recognition device performing a sensor fusion process on the basis of such an output, and the like. The monitoring unit estimates a type of object (particularly, a vehicle, a pedestrian, or a bicycle) that is present on the periphery of the electric vehicle 1 and outputs the type of the object to the traveling control unit 334 together with information of a position and a speed thereof. The driving control, for example, causes the electric vehicle 1 to travel by controlling one or both of steering and acceleration/deceleration of the electric vehicle 1. The driving control, for example, includes driving assistance control of an advanced driver assistance system (ADAS) and the like. The ADAS, for example, includes a lane keeping assistance system (LKAS), an adaptive cruise control system (ACC), a collision mitigation brake system (CMBS), and the like. Although the functions described above are included in any one of the traveling control units 334A and 334B, in this embodiment, control in which only one thereof is caused to function, and the other is not caused to function (by setting a no-use flag or the like in a program) is performed, and any one thereof is caused to perform a process of driving control and the like is performed.

[Supply Power Control Operation]

Figure 7:
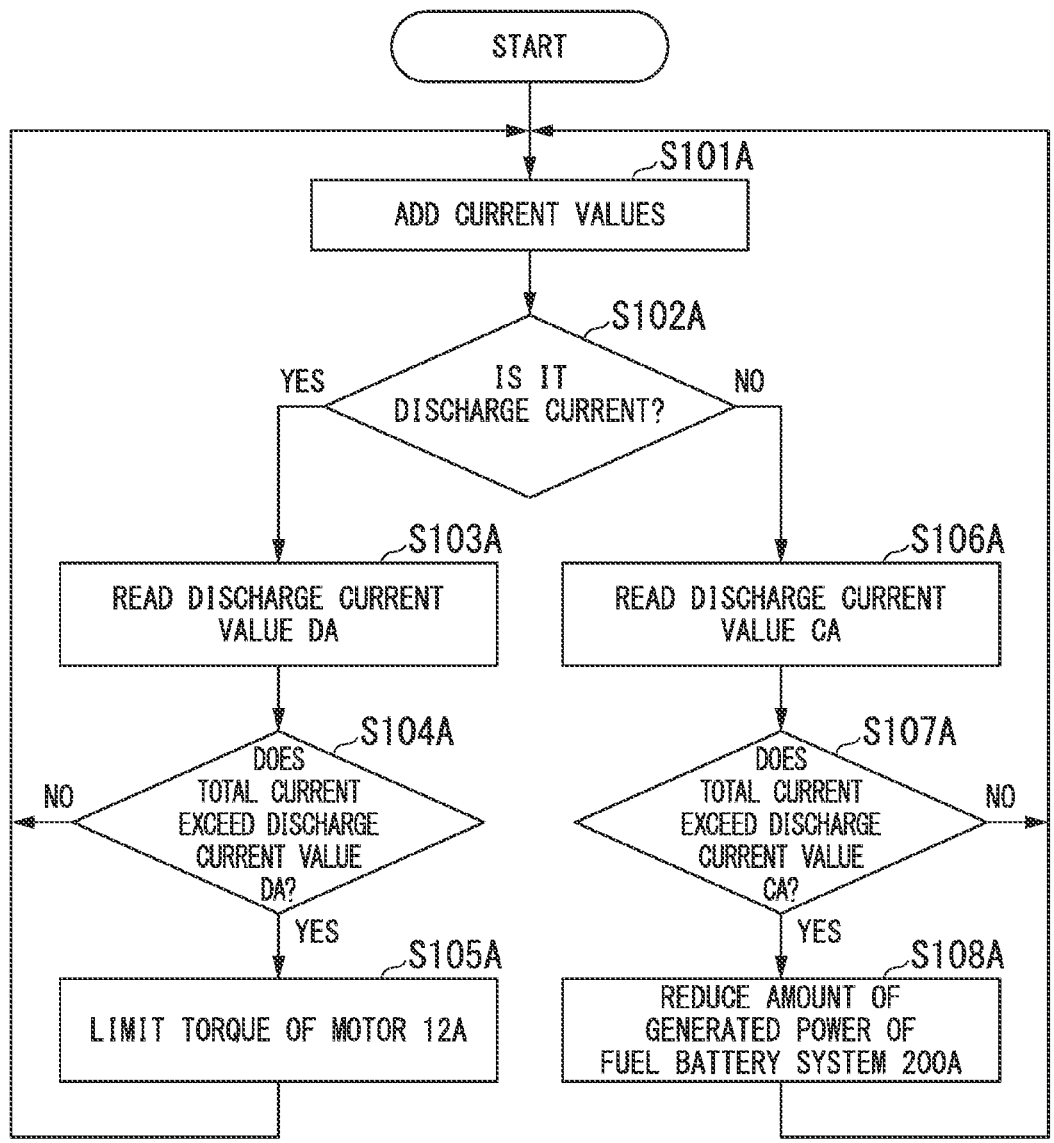
FIG. 7 is a flowchart illustrating an example of an operation in a process of power feed control performed by a drive unit 4A.

FIG. 7 is a flowchart illustrating an example of operations in a process of power feed control performed by the drive unit 4A. After supplying a required amount of power for obtaining a required torque to the battery converter 34A and the fuel battery system 200A on the basis of an output of the vehicle sensor, the power control unit 333A performs the operations of the flowchart illustrated in FIG. 7.

The power control unit 333A acquires a total current value ITA by adding an acquisition value MIA of the current IA supplied from the current sensor 35A and an acquisition value MIB of the current IB supplied from the current sensor 36B (Step S101A). Then, the power control unit 333A determines whether the polarity of the total current value ITA is "+" (a discharge current from the battery 40 to the battery converters 34A and 34B) or "−" (a charge current from the battery converters 34A and 34B to the battery 40) (Step S102A). At this time, in a case in which the polarity of the total current value ITA is "+", the power control unit 333A causes the process to proceed to Step S103A with a total current value IDTA representing a discharge current. On the other hand, in a case in which the polarity of the total current value ITA is "−", the power control unit 333A causes the process to proceed to Step S106A with a total current value ICTA representing a charge current.

Then, the power control unit 333A reads a discharge current value DA set as a threshold of the discharge current from the storage unit 150A (Step S103A). The power control unit 333A compares the acquired total current value IDTA with the read discharge current value DA and determines whether or not the total current value IDTA exceeds the discharge current value DA (Step S104A). At this time, in a case in which the total current value IDTA exceeds the discharge current value DA, the power control unit 333A causes the process to proceed to Step S105A. On the other hand, in a case in which the total current value IDTA is equal to or smaller than the discharge current value DA, the power control unit 333A causes the process to proceed to Step S101A.

Next, in order to limit the torque of the motor 12A (a process of decreasing DC power consumed by the inverter 32A), the power control unit 333A reads an adjustment voltage value stored in association with the discharge current value DA from the storage unit 150A and outputs an instruction for changing (decreasing) a voltage value as a target value for controlling the voltage of the DC-side terminal of the inverter 32A to the battery converter 34A (Step S105A). In accordance with a decrease in the voltage value as the target value of the DC-side terminal, the current value IA caused to flow out from the battery 40 by the battery converter 34A having the voltage value of the DC-side terminal as the target value decreases. The power control unit 333A reads an adjustment value for limiting a torque to a limit torque from the storage unit 150A and decreases a torque generated by the inverter 32A for the motor 12A to the limit torque.

The power control unit 333A reads a charge current value CA set as a threshold of the charge current from the storage unit 150A (Step S106A). The power control unit 333A compares the acquired total current value ICTA with the read charge current value CA and determines whether or not the total current value ICTA exceeds the charge current value CA (Step S107A). At this time, in a case in which the total current value ICTA exceeds the charge current value CA, the power control unit 333A causes the process to proceed to Step S108A. On the other hand, in a case in which the total current value ICTA is equal to or smaller than the charge current value CA, the power control unit 333A causes the process to proceed to Step S101A.

Next, in order to limit the amount of DC power generated by the fuel battery system 200A (a process of decreasing power generated by the fuel battery system 200A), the power control unit 333A reads an adjustment voltage value stored in association with the charge current value CA from the storage unit 150A and outputs an instruction for changing (decreasing) the current value of the DC current as a target value of current control, which is supplied to the DC-side terminal of the inverter 32A, to the fuel battery system 200A (Step S108A). By decreasing the current value as the target value of the DC-side terminal, the current value IA caused to flow into the battery 40 through the battery converter 34A as a charge current decreases.

Figure 8:
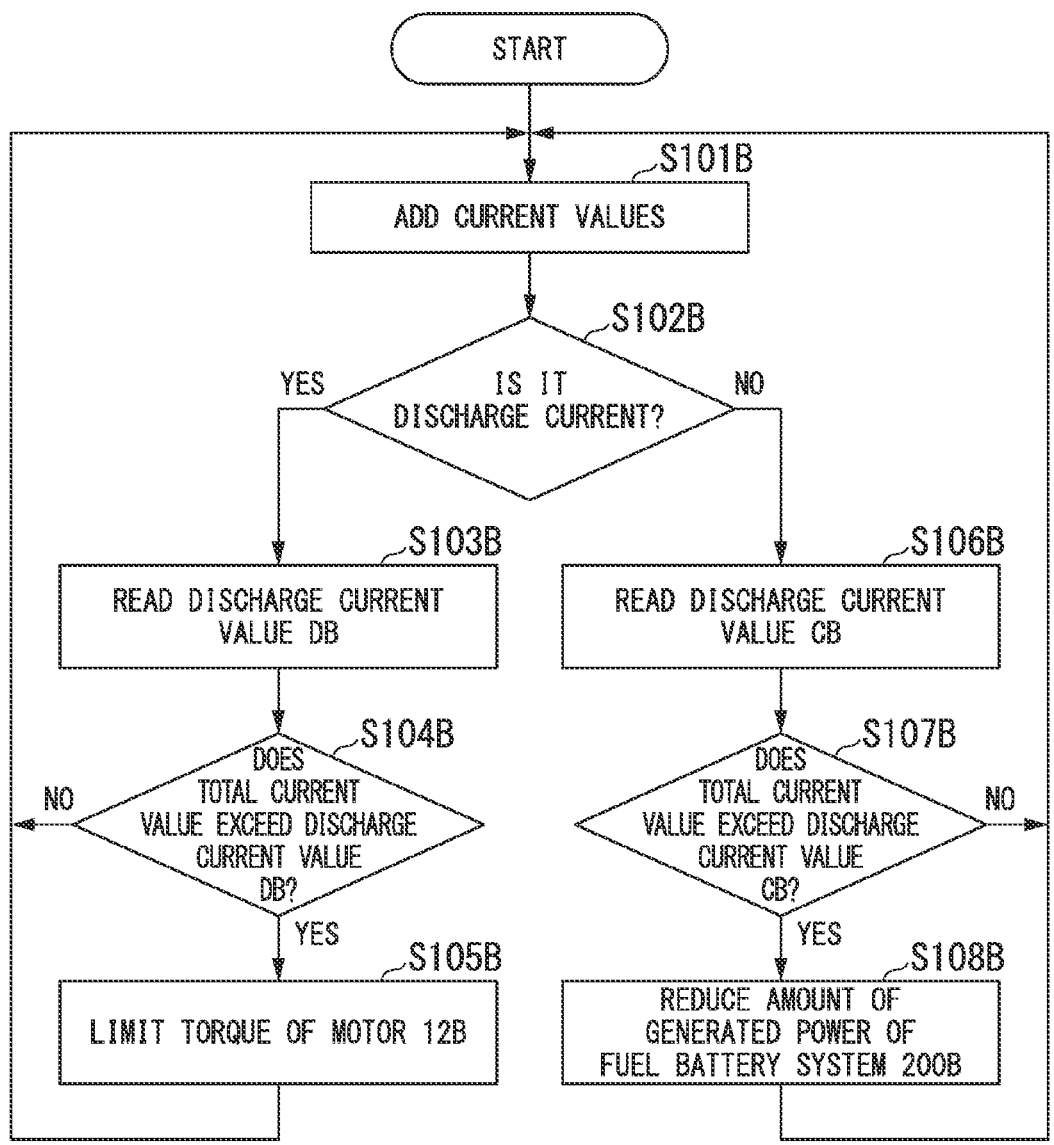
FIG. 8 is a flowchart illustrating an example of operations in a process of power feed control performed by a drive unit 4B.

FIG. 8 is a flowchart illustrating an example of operations in a process of power feed control performed by the drive unit 4B. After supplying a required amount of power for obtaining a required torque to the battery converter 34B and the fuel battery system 200B on the basis of an output of the vehicle sensor, the power control unit 333B performs the operations of the flowchart illustrated in FIG. 8.

The power control unit 333B acquires a total current value ITB by adding an acquisition value MIB of the current IB supplied from the current sensor 35B and an acquisition value MIA of the current IA supplied from the current sensor 36A (Step S101B). Then, the power control unit 333B determines whether the polarity of the total current value ITB is "+" (a discharge current from the battery 40 to the battery converters 34B and 34A) or "−" (a charge current from the battery converters 34B and 34A to the battery 40) (Step S102B). At this time, in a case in which the polarity of the total current value ITB is "+", the power control unit 333B causes the process to proceed to Step S103B with a total current value IDTB representing a discharge current. On the other hand, in a case in which the polarity of the total current value ITB is "−", the power control unit 333B causes the process to proceed to Step S106B with a total current value ICTB representing a charge current.

Then, the power control unit 333B reads a discharge current value DB set as a threshold of the discharge current from the storage unit 150B (Step S103B). The power control unit 333B compares the acquired total current value ICTB with the read discharge current value DB and determines whether or not the total current value IDTB exceeds the discharge current value DB (Step S104B). At this time, in a case in which the total current value IDTB exceeds the discharge current value DB, the power control unit 333B causes the process to proceed to Step S105B. On the other hand, in a case in which the total current value IDTB is equal to or smaller than the discharge current value DB, the power control unit 333B causes the process to proceed to Step S101B.

Next, in order to limit the torque of the motor 12B, the power control unit 333B reads an adjustment voltage value stored in association with the discharge current value DB from the storage unit 150B and outputs an instruction for changing (decreasing) a voltage value as a target value for controlling the voltage of the DC-side terminal of the inverter 32B to the battery converter 34B (Step S105B). In accordance with a decrease in the voltage value as the target value of the DC-side terminal, the current value IB caused to flow out from the battery 40 by the battery converter 34B having the voltage value of the DC-side terminal as the target value decreases. The power control unit 333B reads an adjustment value for limiting a torque to a limit torque from the storage unit 150B and decreases a torque generated by the inverter 32B for the motor 12B to the limit torque.

The power control unit 333B reads a charge current value CA set as a threshold of the charge current from the storage unit 150B (Step S106B). The power control unit 333B compares the acquired total current value ICTB with the read charge current value CB and determines whether or not the total current value ICTB exceeds the charge current value CB (Step S107B). At this time, in a case in which the total current value ICTB exceeds the charge current value CB, the power control unit 333B causes the process to proceed to Step S108B. On the other hand, in a case in which the total current value ICTB is equal to or smaller than the charge current value CB, the power control unit 333B causes the process to proceed to Step S101B.

Next, in order to limit the amount of DC power generated by the fuel battery system 200B (a process of decreasing power generated by the fuel battery system 200B), the power control unit 333B reads an adjustment voltage value stored in association with the charge current value CB from the storage unit 150B and outputs an instruction for changing (decreasing) the current value of the DC current as a target value of current control, which is supplied to the DC-side terminal of the inverter 32B, to the fuel battery system 200B (Step S108B). By decreasing the current value as the target value of the DC-side terminal, the current value IB caused to flow into the battery 40 through the battery converter 34B as a charge current decreases.

The operations of the steps illustrated in FIGS. 7 and 8 described above are performed in synchronization with the power control units 333A and 333B.

For acquisition of this synchronization, for example, the drive units 4A and 4B are connected in a wired manner or a wireless manner, one of the drive units 4A and 4B is set as a master control unit, and the other is set as a slave control unit, and, when the master control unit performs an operation of each step, it transmits a control signal for instructing the slave to perform the operation of the same step.

According to the embodiment described above, in a power feed control system, which is mounted in an electric vehicle 1 (an example of an electrically driven device), performing control of charging and discharging of a battery that is commonly used by operating drive units, which include a motor, a fuel battery system, and an inverter and in which operations of power feed control are independently performed, in parallel, by supplying information of a discharge current and a charge current of each of drive units between the drive units, a total value of a discharge current and a charge current in the battery that is commonly used by the drive units can be detected, and, in a case in which the total value of a discharge current and a charge current from the battery exceeds a threshold set in advance, the discharge current and the charge current can be decreased to values set in advance, and degradation of the function is reduced by protecting the battery, and the system efficiency (power generation efficiency, power feed efficiency, and the like) of the fuel battery system can be further improved.

In this embodiment, a configuration in which, when the discharge current of the battery is decreased, the master control unit described above performs a process of setting a torque of a drive unit thereof to a limit torque and, in a case in which the discharge current of the battery exceeds the discharge current value DA even when the process of setting the torque of the drive unit thereof to the limit torque is performed, supplies a process of decreasing the torque to the limit torque to the slave control unit may be employed. In the case of such a configuration, both of the drive units are not in a stop state, and a state in which traveling can be continued can be maintained.

In this embodiment, although it has been described that the power control unit 333 of the control unit 33 is configured to perform power feed control performed when the discharge current and the charge current in the battery converter 34 increase as control for the FC converter 244 through the fuel cell control device 246, in order to perform control of causing the FC converter 244 to stop or reduce generation of DC power, in other words, to stop or reduce supply of DC power to the DC-side terminal of the inverter 32, and the like at a higher speed, a configuration in which the power control unit 333 directly controls the FC converter 244 may be employed.

In addition, the function of the power control unit 333 for performing power feed control of DC power from the FC converter 244 to the DC terminal side of the inverter 32 when the discharge current and the charge current in the battery converter 34 described above increase may be configured to be included in each FC converter 244. In such a case, an output of each current sensor 35 is directly connected to the FC converter 244.

In this embodiment, although the power control unit 333 of the control unit 33 has been described to perform operations of power feed control when the discharge current and the charge current increase, the control unit 33 may be configured to be provided in the fuel cell control device 246 of the FC converter 244, a controller of the battery converter 34, or the like.

Second Embodiment

Figure 9:
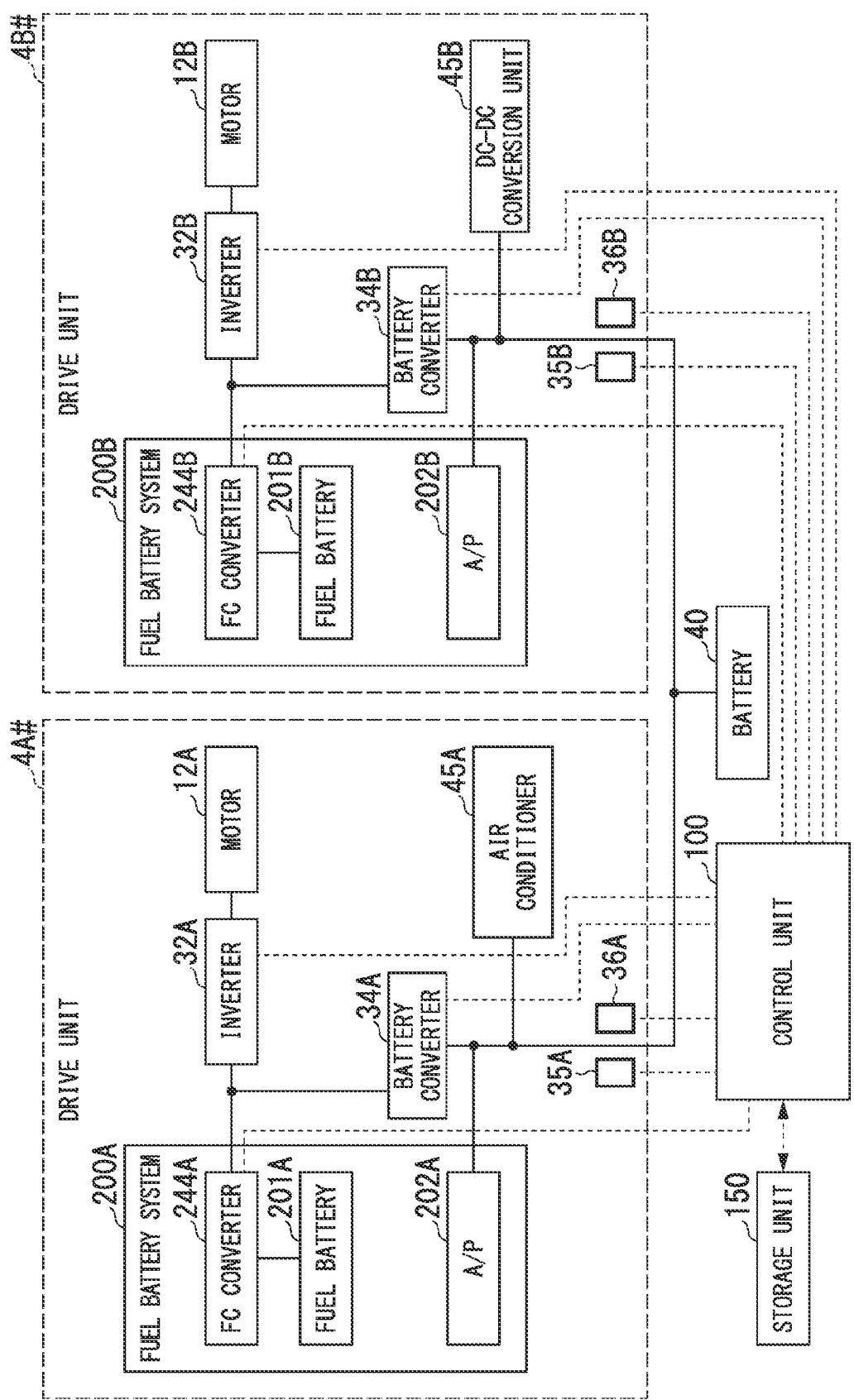
FIG. 9 is a block diagram illustrating an example of the configuration of a power feed control system including drive units 4 # according to a second embodiment.

Next, an example of the configuration of drive units 4A # and 4B # according to a second embodiment will be described. FIG. 9 is a block diagram illustrating an example of the configuration of a power feed control system including drive units 4 # according to the second embodiment. As illustrated in FIG. 9, the power feed control system includes a drive unit 4A #, a drive unit 4B #, a battery 40, a control unit 100, and a storage unit 150. The drive unit 4A # includes a fuel battery system 200A, a battery converter 34A, an inverter 32A, a motor 12A, an air conditioner 45A, a current sensor 35A, and a current sensor 36A. The drive unit 4B # includes a fuel battery system 200B, a battery converter 34B, an inverter 32B, a motor 12B, a DC-DC conversion unit 45B, a current sensor 35B, and a current sensor 36B. In the following description, in a case in which the drive units 4A # and 4B # are not needed to be distinguished from each other, they will be described simply as a "drive units 4 #" without adding A or B.

Hereinafter, configurations and operations according to the second embodiment that are different from those according to the first embodiment will be described. The control units 33 independently included in the drive units 4A and 4B according to the first embodiment are integrated as a control unit 100 in the second embodiment, and the control unit 100 is configured to be commonly connected to the drive units 4A # and 4B #.

Figure 10:
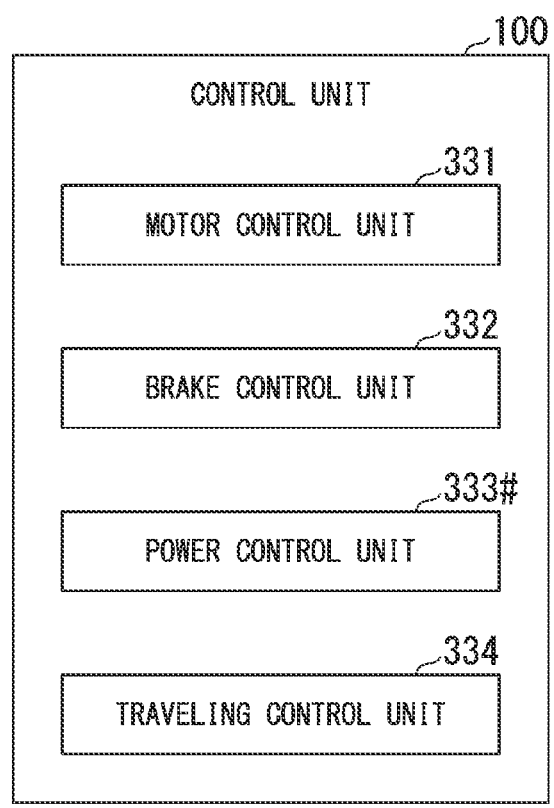
FIG. 10 is a diagram illustrating an example of the configuration of a control unit 100 according to the second embodiment.

FIG. 10 is a diagram illustrating an example of the configuration of the control unit 100 according to the second embodiment. For example, the control unit 100 includes a motor control unit 331, a brake control unit 332, a power control unit 333 #, and a traveling control unit 334. For example, each of the motor control unit 331, the brake control unit 332, the power control unit 333 #, and the traveling control unit 334 is realized by a hardware processor such as a CPU executing a program. Some or all of such constituent elements may be realized by hardware such as an LSI, an ASIC, an FPGA, or a GPU or may be realized by software and hardware in cooperation. The program may be stored in a storage device (a storage device including a non-transitory storage medium) such as an HDD or a flash memory of the electric vehicle 1 in advance or may be stored in a storage medium that can be loaded or unloaded such as a DVD or a CD-ROM and may be installed in the HDD or the flash memory of the electric vehicle 1 by loading the storage medium (a non-transitory storage medium) into a drive device. For example, the storage device described above is the storage unit 150.

The motor control unit 331, the brake control unit 332, and the traveling control unit 334 of the control unit 100 are respectively similar to the brake control unit 332 and the traveling control unit 334 of the control unit 33 according to the first embodiment illustrated in FIG. 4, and thus, the operation of the power control unit 333 # will be described below.

In a case in which a discharge current (a current having "+" polarity in this embodiment) is flowing from the battery 40, the power control unit 333 # adds an acquisition value (current value) MIA supplied from the current sensor 35A of the drive unit 4A # and an acquisition value MIB supplied from the current sensor 36B of the drive unit 4B # and determines whether or not a result of the addition exceeds the discharge current D as a threshold set in advance. In a case in which a charge current (a current having "−" polarity in this embodiment) for the battery 40 is flowing, the power control unit 333 # adds an acquisition value MIA supplied from the current sensor 35A of the drive unit 4A # and an acquisition value MIB supplied from the current sensor 36B of the drive unit 4B # and determines whether or not a result of the addition exceeds the charge current value C as a threshold set in advance.

Operations performed in a case in which the control unit 333 # performs control illustrated in FIGS. 5A to 5C will be described below.

In FIG. 5A, the power control unit 333 # causes the battery converters 34A and 34B and the fuel battery systems 200A (the FC converter 244A) and 200B (the FC converter 244B) to supply a required amount of power for obtaining a required torque on the basis of an output of the vehicle sensor. In accordance with this, the inverter 32A drives the motor 12A with a predetermined torque using DC power acquired by adding up DC power supplied from the fuel battery system 200A and DC power supplied from the battery for adjusting a shortage. The inverter 32B drives the motor 12B with a predetermined torque using DC power acquired by adding up DC power supplied from the fuel battery system 200B and DC power supplied from the battery for adjusting a shortage.

In FIG. 5B, for example, in a case in which a driving force of a vehicle exceeds a frictional force of tires, and a wheel spin occurs, the number of revolutions of the motor 12 rapidly increases, whereby the power consumption of the motor 12 rapidly increases. At this time, the power control unit 333 # instructs the fuel battery systems 200A and 200B to supply a predetermined DC power. For this reason, the fuel battery system 200A supplies an instructed current value to the inverter 32A, and the fuel battery system 200B supplies an instructed current value to the inverter 32B.

However, since power consumption rapidly increases, a voltage of the DC-side terminal of the inverter 32A is lowered, and thus, in order to maintain a voltage of an instruction received from the power control unit 333 #, the battery converter 34A rapidly increases a discharge current from the battery 40. Similarly, a voltage of the DC-side terminal of the inverter 32B is lowered, and thus, in order to maintain a voltage of an instruction received from the power control unit 333 #, the battery converter 34B rapidly increases a discharge current from the battery 40. In this way, since the currents IA and IB that are discharge currents from the battery 40 increase, in accordance with continuation of this state, the battery 40 becomes in an over-discharged state.

In FIG. 5C, the power control unit 333 # adds an acquisition value MIA of a current IA supplied from the current sensor 35A and an acquisition value MIB of a current IB supplied from the current sensor 36B and acquires a result of the addition as a total current value (a discharge current value) IDT. Then, the power control unit 333 # reads a discharge current value D that is a threshold of a discharge current, which has been set in advance, from the storage unit 150 and compares the read discharge current value D with the total current value IDT. At this time, in a case in which the total current value IDT is equal to or lower than the discharge current value D, the power control unit 333 # determines that there is no rapid increase in the discharge current and does not perform a process for inhibiting over-discharge. On the other hand, in a case in which the total current value IDT exceeds the discharge current value D, the power control unit 333 # determines that a rapid increase in the discharge current has occurred and reduces torques to be output by the motors 12A and 12B to a predetermined limit torque. In other words, the power control unit 333 # reads an adjustment voltage value that is a required amount of power corresponding to the limit torque, which is stored in association with the discharge current value D, from the storage unit 150 and outputs this adjustment voltage value to the battery converters 34A and 34B as an instruction value. In accordance with this, a voltage value maintained in the DC-side terminal of the inverter 32A is lowered, and thus, the battery converter 34A decreases the current IA from the battery 40. Similarly, a voltage value maintained in the DC-side terminal of the inverter 32B is lowered, and thus, the battery converter 34B decreases the current IA from the battery 40. The power control unit 333 # reads an adjustment current value at the time of limiting the torque to the limit torque from the storage unit 150 and outputs an instruction to the fuel battery systems 200A and 200B such that the read adjustment current value is set. At this time, the power control unit 333 # reads the adjustment value at the time of limiting the torque to the limit torque from the storage unit 150, outputs an adjustment value for setting the limit torque to the inverters 32A and 32B as an instruction, and decreases a torque generated by the inverter 32B for the motor 12B to the limit torque.

Operations performed in a case in which the control unit 333 # performs control illustrated in FIGS. 6A to 6C will be described below.

In FIG. 6A, the power control unit 333 # causes the battery converter 34A and the fuel battery systems 200A and the battery converter 34B and the fuel battery system 200B to supply a required amount of power for obtaining a required torque on the basis of an output of the vehicle sensor. In accordance with this, the inverter 32A drives the motor 12A with a predetermined torque using DC power acquired by adding up DC power supplied from the fuel battery system 200A and DC power supplied from the battery for adjusting a shortage. The inverter 32B drives the motor 12B with a predetermined torque using DC power acquired by adding up DC power supplied from the fuel battery system 200B and DC power supplied from the battery for adjusting a shortage.

In FIG. 6B, for example, in a case in which locking of tires occurs when braking is applied, the number of revolutions of the motor 12 rapidly decreases, and thus power consumption of the motor 12 rapidly decreases. At this time, the power control unit 333 # instructs the fuel battery systems 200A and 200B to supply a predetermined DC power. For this reason, the fuel battery system 200A supplies an instructed current value to the inverter 32A, and the fuel battery system 200B supplies an instructed current value to the inverter 32B.

However, although the power consumption of the motor 12A rapidly decreases, a current for supplying an instructed DC current continuously flows from the fuel battery system 200A. In accordance with this, the voltage of the DC-side terminal of the inverter 32A increases, and thus, in order to maintain a voltage of an instruction received from the power control unit 333 #, the battery converter 34A rapidly increases a charge current for the battery 40. Similarly, although the power consumption of the motor 12B rapidly decreases, a current for supplying the instructed DC current continuously flows from the fuel battery system 200B. In accordance with this, the voltage of the DC-side terminal of the inverter 32B increases, and thus, in order to maintain a voltage of an instruction received from the power control unit 333 #, the battery converter 34B rapidly increases a charge current for the battery 40. In accordance with this, the currents IA and IB that are charge currents for the battery 40 increase, and thus, in accordance with continuation of this state, the battery 40 comes into an over-charged state.

In FIG. 6C, the power control unit 333 # adds an acquisition value MIA of a current IA supplied from the current sensor 35A and an acquisition value MIB of a current IB supplied from the current sensor 36B and acquires a result of the addition as a total current value (a charge current value) ICT. Then, the power control unit 333A reads a charge current value C that is a threshold of a charge current, which has been set in advance, from the storage unit 150 and compares the read charge current value C with the total current value ICT. At this time, in a case in which the total current value ICT is equal to or smaller than the charge current value C, the power control unit 333 # determines that there is no rapid increase in the charge current and does not perform a process for inhibiting over-charging. On the other hand, in a case in which the total current value ICA exceeds the charge current value C, the power control unit 333 # determines that a rapid increase in the charge current has occurred and, in order to decrease DC power output by the fuel battery systems 200A and 200B, decreases the current value to a predetermined limit current value. In other words, the power control unit 333 # reads an adjustment value that is a limit current value, which is stored in association with the charge current value C, from the storage unit 150 and outputs this adjustment value to the fuel battery systems 200A and 200B as an instruction value. In accordance with this, in order to decrease a current value caused to flow into the DC-side terminal of the inverter 32A, the fuel battery system 200A decreases a current IA as a charge current for the battery 40 to have a target value set in advance. In order to decrease a current value caused to flow into the DC-side terminal of the inverter 32B, the fuel battery system 200B decreases a current IB as a charge current for the battery 40 to have a target value set in advance.

Although the torques of the motors 12A and 12B have been described as being limited to the limit torque, a configuration in which a state in which no torque is generated in the motors 12A and 12B is used as a "0"-torque state, in other words, the inverters 32A and 32B are stopped may be employed. In such a case, the power control unit 333 # outputs an instruction for stopping generation of power in the fuel battery systems 200A and 200B. In the configuration described above, although it has been described that the power control unit 333 # of the control unit 100 is configured to perform power feed control performed when the discharge current and the charge current in the fuel battery system 200 increase as control for the FC converter 244 through the fuel cell control device 246, in order to perform control of causing the FC converter 244 to stop or reduce generation of DC power, in other words, to stop or reduce supply of DC power to the DC-side terminal of the inverter 32, and the like at a higher speed, a configuration in which the power control unit 333 # directly controls the FC converter 244 may be employed.

In addition, the function of the power control unit 333 # for performing power feed control of DC power from the FC converter 244 to the DC terminal side of the inverter 32 when the discharge current and the charge current in the battery converter 34 described above increase may be configured to be included in each FC converter 244. In such a case, an output of each current sensor 35 is directly connected to the FC converter 244.

Figure 11:
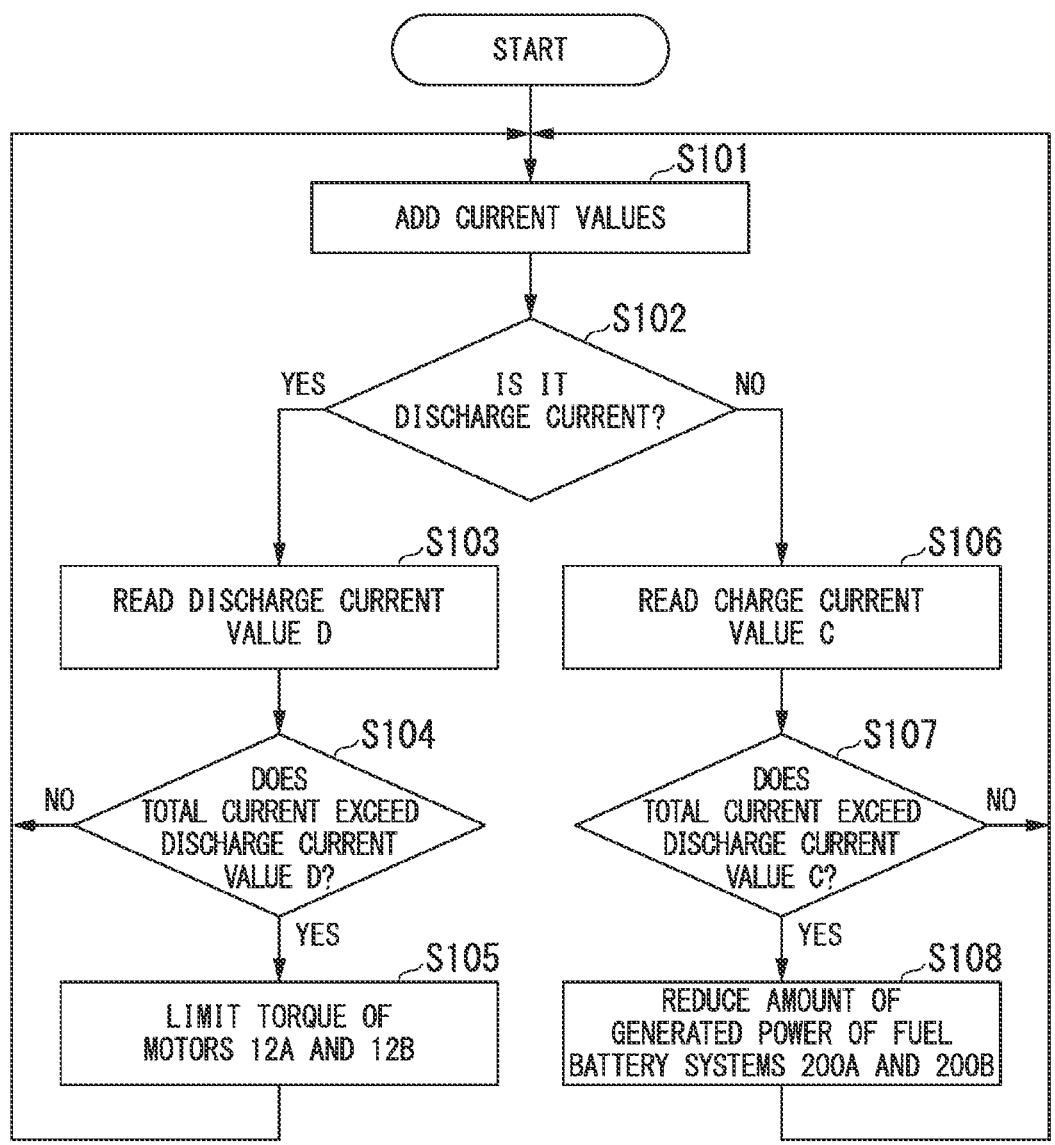
FIG. 11 is a flowchart illustrating an example of an operation in a process of power feed control performed on a drive unit 4 # by the control unit 100.

FIG. 11 is a flowchart illustrating an example of operations in a process of power feed control performed by the control unit 100 for the drive unit 4 #.

After supplying a required amount of power for obtaining a required torque to each of the drive units 4A # and 4B # on the basis of an output of the vehicle sensor, the power control unit 333 # performs the operations of the flowchart illustrated in FIG. 11.

The power control unit 333 # acquires a total current value IT by adding an acquisition value MIA of the current IA supplied from the current sensor 35A and an acquisition value MIB of the current IB supplied from the current sensor 36B (Step S101). Then, the power control unit 333 # determines whether the polarity of the total current value IT is "+" (a discharge current from the battery 40 to the battery converters 34A and 34B) or "−" (a charge current from the battery converters 34A and 34B to the battery 40) (Step S102). At this time, in a case in which the polarity of the total current value IT is "+", the power control unit 333 # causes the process to proceed to Step S103 with a total current value IDT representing a discharge current. On the other hand, in a case in which the polarity of the total current value IT is "−", the power control unit 333 # causes the process to proceed to Step S106 with a total current value ICT representing a charge current.

Then, the power control unit 333 # reads a discharge current value D set as a threshold of the discharge current from the storage unit 150 (Step S103). The power control unit 333 # compares the acquired total current value IDT with the read discharge current value D and determines whether or not the total current value IDT exceeds the discharge current value D (Step S104). At this time, in a case in which the total current value IDT exceeds the discharge current value D, the power control unit 333 # causes the process to proceed to Step S105. On the other hand, in a case in which the total current value IDT is equal to or smaller than the discharge current value D, the power control unit 333 # causes the process to proceed to Step S101.

Next, in order to limit the torques of the motors 12A and 12B (a process of decreasing DC power consumed by the inverter 32A and the inverter 32B), the power control unit 333 # reads an adjustment voltage value stored in association with the discharge current value D from the storage unit 150 and outputs an instruction for changing (decreasing) a voltage value as a target value for controlling the voltages of the DC-side terminals of the inverters 32A and 32B to the battery converters 34A and 34B (Step S105). In accordance with a decrease in the voltage value as the target value of the DC-side terminal, the current value IA caused to flow out from the battery 40 by the battery converter 34A having the voltage value of the DC-side terminal as the target value decreases, and the current value IB caused to flow out from the battery 40 by the battery converter 34B decreases.

The power control unit 333 # reads a charge current value C set as a threshold of the charge current from the storage unit 150 (Step S106). The power control unit 333 # compares the acquired total current value ICT with the read charge current value C and determines whether or not the total current value ICT exceeds the charge current value C (Step S107). At this time, in a case in which the total current value ICT exceeds the charge current value C, the power control unit 333 # causes the process to proceed to Step S108. On the other hand, in a case in which the total current value ICT is equal to or smaller than the charge current value C, the power control unit 333 # causes the process to proceed to Step S101.

Next, in order to limit the amounts of DC power generated by the fuel battery systems 200A and 200B (a process of decreasing power generated by the fuel battery systems 200A and 200B), the power control unit 333 # reads an adjustment voltage value stored in association with the charge current value C from the storage unit 150 and outputs an instruction for changing (decreasing) the current value of the DC current as a target value of current control, which is supplied to the DC-side terminal of the inverter 32, to the fuel battery systems 200A and 200B (Step S108). By decreasing the current value as the target value of the DC-side terminal, the current value IA caused to flow into the battery 40 through the battery converter 34A as a charge current decreases, and the current value IB caused to flow into the battery 40 through the battery converter 34B as a charge current decreases.

According to the embodiment described above, in a power feed control system, which is mounted in an electric vehicle 1 (an example of an electrically driven device), performing control of charging and discharging of a battery that is commonly used by operating drive units, which include a motor, a fuel battery system, and an inverter and in which operations of power feed control are independently performed, in parallel, by integrally processing information of each discharge current and each charge current using the control unit 100 between drive units, a total value of a discharge current and a charge current of a battery that is commonly used by the drive units can be detected, and, in a case in which the total value of the discharge current and the charge current from the battery exceeds a threshold set in advance, the discharge current and the charge current can be decreased to values set in advance, and degradation of the function is reduced by protecting the battery, and the system efficiency (power generation efficiency, power feed efficiency, and the like) of the fuel battery system can be further improved.

In this embodiment, a configuration in which, when a discharge current of the battery is decreased, the control unit 100 performs the process of setting the torque of one drive unit 4 #, for example, the drive unit 4A # to the limit torque, and, in a case in which the discharge current of the battery exceeds the discharge current value D even when the process of setting the torque of the drive unit 4 # to the limit torque, the process of reducing the torque to the limit torque is supplied to the drive unit 4B # that is the other drive unit 4 # may be employed. In the case of such a configuration, both drive units are not caused to come into a stop state, and a state in which traveling can be continued can be maintained.

Although forms for performing the present invention have been described using the embodiments with reference to the drawings, the present invention is not limited to such embodiments at all, and various modifications and substitutions can be made within a range not departing from the concept of the present invention.

What is claimed is:

1. A power feed control system comprising:
a first drive unit configured to include a first electrically driven device, a first inverter that is connected to the first electrically driven device and performs conversion between DC power and AC power, a first fuel battery system that supplies DC power to the first inverter, and a first voltage converter that performs voltage control of controlling a voltage of a DC-side terminal of the first inverter;
a second drive unit configured to include a second electrically driven device, a second inverter that is connected to the second electrically driven device and performs conversion between DC power and AC power, a second fuel battery system that supplies DC power to the second inverter, and a second voltage converter that controls a voltage of a DC-side terminal of the second inverter;
a battery configured to be commonly connected to the first voltage converter and the second voltage converter; and
a control unit configured to perform control of the first inverter or/and the first voltage converter such that each current value of the first inverter and the first fuel battery system achieves a target value of a first current value that is determined on the basis of the first current value flowing between the first drive unit and the battery and a second current value flowing between the second drive unit and the battery and perform control of the second inverter or/and the second voltage converter such that each current value of the second inverter and the second fuel battery system achieves a target value of the second current value that is determined on the basis of the first current value flowing between the first drive unit and the battery and the second current value flowing between the second drive unit and the battery,
wherein the control unit adds the first current value and the second current value and, in a case in which a result of the addition exceeds a predetermined first threshold current value set in a discharge current of the battery, performs torque limiting by decreasing DC power supplied to the first electrically driven device and performs torque limiting by decreasing DC power supplied to the second electrically driven device.

2. The power feed control system according to claim 1, wherein the control unit, after performing torque limiting by decreasing the DC power supplied to the first electrically driven device, adds the first current value and the second current value and performs torque limiting by decreasing the DC power supplied to the second electrically driven device in a case in which a result of the addition exceeds the first threshold current value.

3. The power feed control system according to claim 1, wherein the control unit adds the first current value and the second current value and, in a case in which a result of the addition exceeds a predetermined second threshold current value set in a charge current of the battery, decreases DC power supplied from the first fuel battery system to the first electrically driven device and decreases DC power supplied from the second fuel battery system to the second electrically driven device.

4. The power feed control system according to claim 3, wherein the control unit, after reducing generation of DC power of the first fuel battery system, adds the first current value and the second current value and reduces generation of DC power of the second fuel battery system in a case in which a result of the addition exceeds the second threshold current value.

5. The power feed control system according to claim 1, wherein the control unit is a first control unit of the first drive unit and a second control unit of the second drive unit,
the power feed control system further comprising:
a (1-1)-th current sensor configured to acquire the first current value and output the acquired value to the first control unit;
a (1-2)-th current sensor configured to acquire the first current value and output the acquired value to the second control unit;
a (2-1)-th current sensor configured to acquire the second current value and output the acquired value to the first control unit; and
a (2-2)-th current sensor configured to acquire the second current value and output the acquired value to the second control unit.

6. The power feed control system according to claim 5, wherein a total current sensor is disposed between a power supply terminal of the battery and a point branching into the first drive unit and the second drive unit in place of each of the (1-2)-th current sensor and the (2-1)-th current sensor, and
wherein the total current sensor acquires a current value acquired by adding the first current value and the second current value.

7. The power feed control system according to claim 1, further comprising:
a first current sensor configured to acquire the first current value and output the acquired value to the control unit; and
a second current sensor configured to acquire the second current value and output the acquired value to the control unit.

8. A power feed control method for driving a power feed control system including:
a first drive unit configured to include a first electrically driven device, a first inverter that is connected to the first electrically driven device and performs conversion between DC power and AC power, a first fuel battery system that supplies DC power to the first inverter, and a first voltage converter that controls a voltage of a DC-side terminal of the first inverter;
a second drive unit configured to include a second electrically driven device, a second inverter that is connected to the second electrically driven device and performs conversion between DC power and AC power, a second fuel battery system that supplies DC power to the second inverter, and a second voltage converter that controls a voltage of a DC-side terminal of the second inverter;
a battery configured to be commonly connected to the first voltage converter and the second voltage converter; and
a control unit,
the power feed control method comprising performing control of the first inverter or/and the first voltage converter such that each current value of the first inverter and the first fuel battery system achieves a target value of a first current value that is determined on the basis of the first current value flowing between the first drive unit and the battery and a second current value flowing between the second drive unit and the battery and performing control of the second inverter or/and the second voltage converter such that each current value of the second inverter and the second fuel battery system achieves a target value of the second current value that is determined on the basis of a first current value flowing between the first drive unit and the battery and a second current value flowing between the second drive unit and the battery by using the control unit, wherein the power feed control method further comprises adding the first current value and the second current value and, in a case in which a result of the addition exceeds a predetermined first threshold current value set in a discharge current of the battery, performing torque limiting by decreasing DC power supplied to the first electrically driven device and performing torque limiting by decreasing DC power supplied to the second electrically driven device.

9. A power feed control system comprising:
a first drive unit configured to include a first electrically driven device, a first inverter that is connected to the first electrically driven device and performs conversion between DC power and AC power, a first fuel battery system that supplies DC power to the first inverter, and a first voltage converter that performs voltage control of controlling a voltage of a DC-side terminal of the first inverter;
a second drive unit configured to include a second electrically driven device, a second inverter that is connected to the second electrically driven device and performs conversion between DC power and AC power, a second fuel battery system that supplies DC power to the second inverter, and a second voltage converter that controls a voltage of a DC-side terminal of the second inverter;
a battery configured to be commonly connected to the first voltage converter and the second voltage converter; and
a control unit configured to perform control of the first inverter or/and the first voltage converter such that each current value of the first inverter and the first fuel battery system achieves a target value of a first current value that is determined on the basis of the first current value flowing between the first drive unit and the battery and a second current value flowing between the second drive unit and the battery and perform control of the second inverter or/and the second voltage converter such that each current value of the second inverter and the second fuel battery system achieves a target value of the second current value that is determined on the basis of the first current value flowing between the first drive unit and the battery and the second current value flowing between the second drive unit and the battery,
wherein the control unit adds the first current value and the second current value and, in a case in which a result of the addition exceeds a predetermined second threshold current value set in a charge current of the battery, decreases DC power supplied from the first fuel battery system to the first electrically driven device and decreases DC power supplied from the second fuel battery system to the second electrically driven device.

10. The power feed control system according to claim 9, wherein the control unit, after performing torque limiting by decreasing the DC power supplied to the first electrically driven device, adds the first current value and the second current value and performs torque limiting by decreasing the DC power supplied to the second electrically driven device in a case in which a result of the addition exceeds the first threshold current value.

11. The power feed control system according to claim 9, wherein the control unit, after reducing generation of DC power of the first fuel battery system, adds the first current value and the second current value and reduces generation of DC power of the second fuel battery system in a case in which a result of the addition exceeds the second threshold current value.

12. The power feed control system according to claim 9, wherein the control unit is a first control unit of the first drive unit and a second control unit of the second drive unit,
the power feed control system further comprising:
a (1-1)-th current sensor configured to acquire the first current value and output the acquired value to the first control unit;
a (1-2)-th current sensor configured to acquire the first current value and output the acquired value to the second control unit;
a (2-1)-th current sensor configured to acquire the second current value and output the acquired value to the first control unit; and
a (2-2)-th current sensor configured to acquire the second current value and output the acquired value to the second control unit.

13. The power feed control system according to claim 12, wherein a total current sensor is disposed between a power supply terminal of the battery and a point branching into the first drive unit and the second drive unit in place of each of the (1-2)-th current sensor and the (2-1)-th current sensor, and
wherein the total current sensor acquires a current value acquired by adding the first current value and the second current value.

14. The power feed control system according to claim 9, further comprising:
a first current sensor configured to acquire the first current value and output the acquired value to the control unit; and
a second current sensor configured to acquire the second current value and output the acquired value to the control unit.

* * * * *